US008301493B2

(12) United States Patent
Sanders et al.

(10) Patent No.: US 8,301,493 B2
(45) Date of Patent: Oct. 30, 2012

(54) SYSTEM AND METHOD FOR PROVIDING INCENTIVES TO CONSUMERS TO SHARE INFORMATION

(75) Inventors: Shelley F. Sanders, Landenberg, PA (US); Theodore Bowers, Greenville, DE (US); Dean Ilijasic, Westerville, OH (US)

(73) Assignee: JPMorgan Chase Bank, N.A., New York, NY (US)

( * ) Notice: Subject to any disclaimer, the term of this patent is extended or adjusted under 35 U.S.C. 154(b) by 1700 days.

(21) Appl. No.: 10/287,558

(22) Filed: Nov. 5, 2002

(65) Prior Publication Data

US 2004/0088219 A1 May 6, 2004

(51) Int. Cl.
*G06Q 30/00* (2012.01)

(52) U.S. Cl. .................. 705/14.1; 705/14.2; 705/14.17; 705/14.18; 705/14.25; 705/14.36

(58) Field of Classification Search .................... 705/14, 705/14.1, 14.2, 14.17–19, 14.25, 14.36
See application file for complete search history.

(56) References Cited

U.S. PATENT DOCUMENTS

| | | | |
|---|---|---|---|
| 2,005,003 | A | 6/1935 | Patton et al. |
| 2,405,500 | A | 8/1946 | Guanella |
| 3,665,162 | A | 5/1972 | Yamamoto et al. |
| 3,705,385 | A | 12/1972 | Batz |
| 3,860,870 | A | 1/1975 | Furuya |
| 3,896,266 | A | 7/1975 | Waterbury |
| 3,938,090 | A | 2/1976 | Borison et al. |
| 3,938,091 | A | 2/1976 | Atalla et al. |
| 4,013,962 | A | 3/1977 | Beseke et al. |
| 4,123,747 | A | 10/1978 | Lancto et al. |
| 4,160,120 | A | 7/1979 | Barnes et al. |
| 4,200,770 | A | 4/1980 | Hellman et al. |
| 4,223,403 | A | 9/1980 | Konheim et al. |
| 4,249,180 | A | 2/1981 | Eberle et al. |
| 4,255,811 | A | 3/1981 | Adler |
| 4,302,810 | A | 11/1981 | Bouricius et al. |
| 4,316,055 | A | 2/1982 | Feistel |
| 4,319,336 | A | 3/1982 | Anderson et al. |
| 4,321,672 | A | 3/1982 | Braun et al. |
| 4,405,829 | A | 9/1983 | Rivest et al. |
| 4,453,074 | A | 6/1984 | Weinstein |
| 4,454,414 | A | 6/1984 | Benton |
| 4,471,164 | A | 9/1984 | Henry |

(Continued)

FOREIGN PATENT DOCUMENTS

CA 2430549 6/2002

(Continued)

OTHER PUBLICATIONS

Definition of opt out, http://en.wiktionary.org/wiki/opt_out (1 page).*

(Continued)

*Primary Examiner* — Khanh H Le
(74) *Attorney, Agent, or Firm* — Hunton & Williams LLP

(57) ABSTRACT

A system and method for providing incentives to consumers to share their consumer information with third parties is provided. According to one aspect of the present invention, a method is provided which includes the steps of: accepting consumer information; storing the consumer information; requesting permission from the consumer to share their consumer information with a third party; and offering the consumer a selected incentive in exchange for their permission to share their consumer information.

6 Claims, 7 Drawing Sheets

U.S. PATENT DOCUMENTS 4,523,087 A 6/1985 Benton
4,529,870 A 7/1985 Chaum
4,567,359 A 1/1986 Lockwood
4,575,621 A 3/1986 Dreifus
4,605,820 A 8/1986 Campbell, Jr.
4,605,844 A 8/1986 Haggan
4,614,861 A 9/1986 Pavlov et al.
4,633,397 A 12/1986 Macco
4,641,239 A 2/1987 Takesako
4,650,981 A 3/1987 Foletta
4,661,658 A 4/1987 Matyas
4,663,500 A 5/1987 Okamoto et al.
4,695,880 A 9/1987 Johnson
4,696,491 A 9/1987 Stenger
4,697,072 A 9/1987 Kawana
4,701,601 A 10/1987 Francini et al.
4,713,760 A 12/1987 Yamada et al.
4,713,761 A 12/1987 Sharpe
4,723,246 A 2/1988 Weldon, Jr.
4,725,719 A 2/1988 Oncken et al.
4,745,468 A 5/1988 Von Kohorn
4,747,050 A 5/1988 Brachtl et al.
4,747,139 A 5/1988 Taaffe
4,752,676 A 6/1988 Leonard et al.
4,799,156 A 1/1989 Shavit
4,801,787 A 1/1989 Suzuki
4,823,264 A 4/1989 Deming
4,845,347 A 7/1989 McCrindle
4,859,837 A 8/1989 Halpern
4,868,877 A 9/1989 Fischer
4,877,947 A 10/1989 Masu et al.
4,882,675 A 11/1989 Nichtberger et al.
4,890,324 A 12/1989 Jansen
4,891,503 A 1/1990 Jewell
4,926,255 A 5/1990 Von Kohorn
4,941,090 A 7/1990 McCarthy
4,964,043 A 10/1990 Galvin
4,965,568 A 10/1990 Atalla et al.
4,977,501 A 12/1990 Lefevre
4,980,913 A 12/1990 Skret
4,984,272 A 1/1991 McIlroy et al.
4,992,940 A 2/1991 Dworkin
5,001,755 A 3/1991 Skret
5,005,200 A 4/1991 Fischer
5,016,270 A 5/1991 Katz
5,016,274 A 5/1991 Micali et al.
5,018,196 A 5/1991 Takaragi et al.
5,023,782 A 6/1991 Lutz et al.
5,025,372 A 6/1991 Burton et al.
5,050,207 A 9/1991 Hitchcock
5,054,067 A 10/1991 Moroney et al.
5,056,019 A 10/1991 Schultz et al.
5,072,380 A 12/1991 Randelman et al.
5,084,816 A 1/1992 Boese
5,097,115 A 3/1992 Ogasawara et al.
5,117,355 A 5/1992 McCarthy
5,122,950 A 6/1992 Mee
5,157,717 A 10/1992 Hitchcock
5,161,244 A 11/1992 Maurer
5,163,098 A 11/1992 Dahbura
5,175,682 A 12/1992 Higashiyama
5,189,606 A 2/1993 Burns et al.
5,196,840 A 3/1993 Leith et al.
5,202,826 A 4/1993 McCarthy
5,212,792 A 5/1993 Gerety et al.
5,220,501 A 6/1993 Lawlor
5,225,664 A 7/1993 Iijima
5,231,569 A 7/1993 Myatt et al.
5,231,668 A 7/1993 Kravitz
5,233,654 A 8/1993 Harvey et al.
5,235,509 A 8/1993 Mueller et al.
5,237,620 A 8/1993 Deaton
5,241,594 A 8/1993 Kung
5,253,294 A 10/1993 Maurer
5,257,486 A 11/1993 Holmwall
5,265,008 A 11/1993 Benton et al.
5,265,033 A 11/1993 Vajk
5,267,314 A 11/1993 Stambler
5,276,311 A 1/1994 Hennige
5,287,268 A 2/1994 McCarthy
5,297,026 A 3/1994 Hoffman
5,302,810 A 4/1994 Gauthier et al.
5,305,456 A 4/1994 Boitana
5,311,594 A 5/1994 Penzias
5,315,504 A 5/1994 Lembie
5,317,683 A 5/1994 Hager
5,319,710 A 6/1994 Atalla et al.
5,321,841 A 6/1994 East
5,341,428 A 8/1994 Schatz
5,351,186 A 9/1994 Bullock
5,351,187 A 9/1994 Hassett
5,352,877 A 10/1994 Morley
5,367,572 A 11/1994 Weiss
5,381,332 A 1/1995 Wood
5,382,784 A 1/1995 Eberhardt
5,412,708 A 5/1995 Katz
5,412,730 A 5/1995 Jones
5,420,405 A 5/1995 Chasek
5,428,684 A 6/1995 Akiyama et al.
5,430,644 A 7/1995 Deaton et al.
5,432,326 A 7/1995 Noblett et al.
5,446,740 A 8/1995 Yien
5,448,471 A 9/1995 Deaton et al.
5,450,134 A 9/1995 Legate
5,450,491 A 9/1995 McNair
5,450,537 A 9/1995 Hirai
5,465,206 A 11/1995 Hilt et al.
5,466,920 A 11/1995 Nair et al.
5,467,269 A 11/1995 Flaten
5,469,576 A 11/1995 Dauerer et al.
5,473,143 A 12/1995 Vak
5,473,732 A 12/1995 Change
5,479,530 A 12/1995 Nair et al.
5,483,444 A 1/1996 Heintzeman et al.
5,485,370 A 1/1996 Moss et al.
5,495,981 A 3/1996 Warther
5,500,890 A 3/1996 Rogge et al.
5,502,636 A 3/1996 Clarke
5,511,117 A 4/1996 Zazzera
5,513,102 A 4/1996 Auriemma
5,524,073 A 6/1996 Stambler
5,532,689 A 7/1996 Bueno
5,532,920 A 7/1996 Hartrick
5,534,855 A 7/1996 Shockley et al.
5,537,314 A 7/1996 Kanter
5,537,473 A 7/1996 Saward
5,539,825 A 7/1996 Akiyama et al.
5,541,583 A 7/1996 Mandelbaum
5,544,086 A 8/1996 Davis et al.
5,546,452 A 8/1996 Andrews
5,550,734 A 8/1996 Tarter
5,551,021 A 8/1996 Harada
5,555,303 A 9/1996 Stambler
5,557,334 A 9/1996 Legate
5,557,518 A 9/1996 Rosen
5,560,008 A 9/1996 Johnson et al.
5,568,489 A 10/1996 Yien
5,570,295 A 10/1996 Isenberg
5,570,465 A 10/1996 Tsakanikas
5,576,951 A 11/1996 Lockwood
5,583,778 A 12/1996 Wind
5,583,933 A 12/1996 Mark
5,590,038 A 12/1996 Pitroda
5,590,197 A 12/1996 Chen
5,590,199 A 12/1996 Krajewski et al.
5,592,378 A 1/1997 Cameron
5,592,553 A 1/1997 Guski et al.
5,592,560 A 1/1997 Deaton
5,594,837 A 1/1997 Noyes
5,598,557 A 1/1997 Doner
5,602,936 A 2/1997 Green et al.
5,603,025 A 2/1997 Tabb
5,604,490 A 2/1997 Blakley et al.
5,606,496 A 2/1997 D'Agostino
5,611,052 A 3/1997 Dykstra
5,615,277 A 3/1997 Hoffman
5,617,474 A 4/1997 Ditzig et al.

5,621,201 A 4/1997 Langhans
5,621,789 A 4/1997 McCalmont
5,621,812 A 4/1997 Deaton
5,625,767 A 4/1997 Bartell
5,634,101 A 5/1997 Blau
5,638,457 A 6/1997 Deaton
5,640,577 A 6/1997 Scharmer
5,642,419 A 6/1997 Rosen
5,642,485 A 6/1997 Deaton et al.
5,644,493 A 7/1997 Motai
5,644,723 A 7/1997 Deaton et al.
5,644,778 A 7/1997 Burks et al.
5,646,998 A 7/1997 Stambler
5,649,114 A 7/1997 Deaton et al.
5,652,786 A 7/1997 Rogers
5,653,914 A 8/1997 Holmes et al.
5,657,383 A 8/1997 Gerber
5,657,390 A 8/1997 Elgamal et al.
5,659,165 A 8/1997 Jennings
5,659,469 A 8/1997 Deaton et al.
5,661,807 A 8/1997 Guski et al.
5,664,115 A 9/1997 Fraser
5,666,493 A 9/1997 Wojcik et al.
5,671,285 A 9/1997 Newman
5,675,637 A 10/1997 Szlam et al.
5,675,662 A 10/1997 Deaton
5,677,521 A 10/1997 Garrou
5,677,955 A 10/1997 Doggett et al.
5,678,046 A 10/1997 Cahill et al.
5,680,459 A 10/1997 Hook et al.
5,682,524 A 10/1997 Freund
5,684,870 A 11/1997 Maloney
5,687,322 A 11/1997 Deaton et al.
5,689,100 A 11/1997 Carrithers et al.
5,692,124 A 11/1997 Holden et al.
5,692,132 A 11/1997 Hogan
5,698,837 A 12/1997 Furuta
5,699,528 A 12/1997 Hogan
5,703,344 A 12/1997 Bezy et al.
5,704,044 A 12/1997 Tarter et al.
5,706,452 A 1/1998 Ivanov
5,710,886 A 1/1998 Christensen et al.
5,710,887 A 1/1998 Chelliah
5,710,889 A 1/1998 Clark et al.
5,715,298 A 2/1998 Rogers
5,715,314 A 2/1998 Payne
5,715,399 A 2/1998 Bezos
5,715,402 A 2/1998 Popolo
5,715,450 A 2/1998 Ambrose
5,724,423 A 3/1998 Khello
5,724,424 A 3/1998 Gifford
5,727,163 A 3/1998 Bezos
5,734,838 A 3/1998 Robinson
5,737,414 A 4/1998 Walker et al.
5,740,231 A 4/1998 Cohn
5,742,845 A 4/1998 Wagner
5,745,555 A 4/1998 Mark
5,754,840 A 5/1998 Rivette
5,758,126 A 5/1998 Daniels et al.
5,758,328 A 5/1998 Giovannoli
5,761,288 A 6/1998 Pinard et al.
5,761,647 A 6/1998 Boushy
5,761,661 A 6/1998 Coussenns
5,764,770 A 6/1998 Schipper et al.
5,764,789 A 6/1998 Pare et al.
5,765,141 A 6/1998 Spector
5,765,143 A 6/1998 Sheldon
5,768,382 A 6/1998 Schneier et al.
5,774,122 A 6/1998 Kojima
5,778,178 A 7/1998 Arunachalam
5,781,909 A 7/1998 Logan et al.
5,784,562 A 7/1998 Diener
5,787,403 A 7/1998 Randle
5,787,404 A 7/1998 Fernandez-Holmann
5,789,732 A 8/1998 McMahon et al.
5,790,650 A 8/1998 Dunn
5,790,785 A 8/1998 Klug
5,793,302 A 8/1998 Mark
5,793,861 A 8/1998 Haigh
5,794,178 A 8/1998 Caid
5,794,207 A 8/1998 Walker
5,794,221 A 8/1998 Egendorf
5,794,259 A 8/1998 Kikinis
5,796,395 A 8/1998 De Hond
5,796,827 A 8/1998 Coppersmith et al.
5,797,127 A 8/1998 Walker et al.
5,798,508 A 8/1998 Walker et al.
5,802,498 A 9/1998 Comesanas
5,802,502 A 9/1998 Gell
5,805,719 A 9/1998 Pare et al.
5,815,657 A 9/1998 Williams
5,815,665 A 9/1998 Teper et al.
5,815,683 A 9/1998 Vogler
5,818,936 A 10/1998 Moshayekhi
5,819,092 A 10/1998 Ferguson
5,819,285 A 10/1998 Damico
5,825,003 A 10/1998 Jennings et al.
5,825,863 A 10/1998 Walker
5,825,870 A 10/1998 Miloslavsky
5,825,871 A 10/1998 Mark
5,825,890 A 10/1998 Elgamal et al.
5,826,023 A 10/1998 Hall et al.
5,826,241 A 10/1998 Stein
5,826,245 A 10/1998 Sandberg-Diment
5,826,250 A 10/1998 Trefler
5,828,734 A 10/1998 Katz
5,828,751 A 10/1998 Walker et al.
5,828,812 A 10/1998 Khan et al.
5,828,833 A 10/1998 Belville et al.
5,832,090 A 11/1998 Raspotnik
5,832,211 A 11/1998 Blakley, III et al.
5,832,457 A 11/1998 O'Brien
5,832,460 A 11/1998 Bednar
5,832,476 A 11/1998 Tada
5,835,087 A 11/1998 Herz
5,835,580 A 11/1998 Fraser
5,835,603 A 11/1998 Coutts
5,838,812 A 11/1998 Pare et al.
5,838,903 A 11/1998 Blakely, III et al.
5,838,906 A 11/1998 Doyle
5,841,869 A 11/1998 Merkling et al.
5,842,178 A 11/1998 Giovannoli
5,842,211 A 11/1998 Horadan
5,842,421 A 12/1998 Desilets et al.
5,844,553 A 12/1998 Hao
5,845,259 A 12/1998 West
5,845,260 A 12/1998 Nakano
5,847,709 A 12/1998 Card
5,848,143 A 12/1998 Andrews
5,848,190 A 12/1998 Kleehammer et al.
5,848,400 A 12/1998 Chang
5,848,427 A 12/1998 Hyodo
5,852,811 A 12/1998 Atkins
5,852,812 A 12/1998 Reeder
5,857,023 A 1/1999 Demers et al.
5,859,419 A 1/1999 Wynn
5,861,906 A 1/1999 Dunn et al.
5,862,223 A 1/1999 Walker
5,862,323 A 1/1999 Blakley, III et al.
5,864,830 A 1/1999 Armetta et al.
5,864,871 A 1/1999 Kitain et al.
RE36,116 E 2/1999 McCarthy
5,866,889 A 2/1999 Weiss et al.
5,870,456 A 2/1999 Rogers
5,870,718 A 2/1999 Spector
5,870,721 A 2/1999 Norris
5,870,724 A 2/1999 Lawlor
5,870,725 A 2/1999 Bellinger et al.
5,871,398 A 2/1999 Schneier et al.
5,873,072 A 2/1999 Kight
5,873,096 A 2/1999 Lim
5,875,296 A 2/1999 Shi et al.
5,878,141 A 3/1999 Daly et al.
5,878,405 A 3/1999 Grant et al.
5,880,769 A 3/1999 Nemirofsky
5,883,810 A 3/1999 Franklin et al.
5,884,032 A 3/1999 Bateman
5,884,270 A 3/1999 Walker et al.

| | | | |
|---|---|---|---|
| 5,884,272 | A | 3/1999 | Walker et al. |
| 5,884,274 | A | 3/1999 | Walker et al. |
| 5,884,288 | A | 3/1999 | Chang |
| 5,884,312 | A | 3/1999 | Dustan et al. |
| 5,889,863 | A | 3/1999 | Weber |
| 5,892,900 | A | 4/1999 | Ginter |
| 5,898,780 | A | 4/1999 | Liu |
| 5,898,838 | A | 4/1999 | Wagner |
| 5,899,982 | A | 5/1999 | Randle |
| 5,903,878 | A | 5/1999 | Talati et al. |
| 5,903,881 | A | 5/1999 | Schrader |
| 5,905,908 | A | 5/1999 | Wagner |
| 5,907,142 | A | 5/1999 | Kelsey |
| 5,909,486 | A | 6/1999 | Walker et al. |
| 5,910,988 | A | 6/1999 | Ballard |
| 5,913,202 | A | 6/1999 | Motoyama |
| 5,914,472 | A | 6/1999 | Foladare |
| 5,915,244 | A | 6/1999 | Jack |
| 5,918,214 | A | 6/1999 | Perkowski |
| 5,918,217 | A | 6/1999 | Maggioncalda |
| 5,918,239 | A | 6/1999 | Allen |
| 5,920,847 | A | 7/1999 | Kolling et al. |
| 5,921,864 | A | 7/1999 | Walker et al. |
| 5,923,552 | A | 7/1999 | Brown et al. |
| 5,923,763 | A | 7/1999 | Walker et al. |
| 5,926,796 | A | 7/1999 | Walker et al. |
| 5,926,812 | A | 7/1999 | Hilsenrath |
| 5,930,764 | A | 7/1999 | Melchione |
| 5,933,812 | A | 8/1999 | Meyer et al. |
| 5,933,816 | A | 8/1999 | Zeanah |
| 5,933,817 | A | 8/1999 | Hucal |
| 5,933,823 | A | 8/1999 | Cullen |
| 5,933,827 | A | 8/1999 | Cole |
| 5,936,541 | A | 8/1999 | Stambler |
| 5,940,811 | A | 8/1999 | Norris |
| 5,940,812 | A | 8/1999 | Tengel |
| 5,940,843 | A | 8/1999 | Zucknovich et al. |
| 5,943,656 | A | 8/1999 | Crooks |
| 5,944,824 | A | 8/1999 | He |
| 5,945,653 | A | 8/1999 | Walker et al. |
| 5,946,388 | A | 8/1999 | Walker et al. |
| 5,947,747 | A | 9/1999 | Walker et al. |
| 5,949,044 | A | 9/1999 | Walker et al. |
| 5,949,875 | A | 9/1999 | Walker et al. |
| 5,950,173 | A | 9/1999 | Perkowski |
| 5,950,174 | A | 9/1999 | Brendzel |
| 5,950,206 | A | 9/1999 | Krause |
| 5,952,639 | A | 9/1999 | Ohki |
| 5,952,641 | A | 9/1999 | Korshun |
| 5,953,710 | A | 9/1999 | Fleming |
| 5,956,695 | A | 9/1999 | Carrithers et al. |
| 5,958,007 | A | 9/1999 | Lee |
| 5,960,411 | A | 9/1999 | Hartman |
| 5,961,593 | A | 10/1999 | Gabber et al. |
| 5,963,635 | A | 10/1999 | Szlam et al. |
| 5,963,647 | A | 10/1999 | Downing et al. |
| 5,963,915 | A | 10/1999 | Kirsch |
| 5,963,925 | A | 10/1999 | Kolling et al. |
| 5,963,952 | A | 10/1999 | Kent |
| 5,963,953 | A | 10/1999 | Cram |
| 5,966,695 | A | 10/1999 | Melchione et al. |
| 5,966,699 | A | 10/1999 | Zandi |
| 5,967,896 | A | 10/1999 | Jorasch et al. |
| 5,969,318 | A | 10/1999 | Mackenthun |
| 5,970,143 | A | 10/1999 | Schneier et al. |
| 5,970,470 | A | 10/1999 | Walker et al. |
| 5,970,478 | A | 10/1999 | Walker et al. |
| 5,970,480 | A | 10/1999 | Kalina |
| 5,970,482 | A | 10/1999 | Pham |
| 5,970,483 | A | 10/1999 | Evans |
| 5,974,148 | A | 10/1999 | Stambler |
| 5,978,467 | A | 11/1999 | Walker et al. |
| 5,982,370 | A | 11/1999 | Kamper |
| 5,983,196 | A | 11/1999 | Wendkos |
| 5,987,434 | A | 11/1999 | Libman |
| 5,987,454 | A | 11/1999 | Hobbs |
| 5,987,498 | A | 11/1999 | Athing et al. |
| 5,991,736 | A | 11/1999 | Ferguson et al. |
| 5,991,738 | A | 11/1999 | Ogram |
| 5,991,740 | A | 11/1999 | Messer |
| 5,991,748 | A | 11/1999 | Taskett |
| 5,991,751 | A | 11/1999 | Rivette |
| 5,991,780 | A | 11/1999 | Rivette |
| 5,991,878 | A | 11/1999 | McDonough et al. |
| 5,995,948 | A | 11/1999 | Whitford |
| 5,995,976 | A | 11/1999 | Walker et al. |
| 5,999,596 | A | 12/1999 | Walker et al. |
| 5,999,907 | A | 12/1999 | Donner |
| 5,999,971 | A | 12/1999 | Buckland |
| 6,000,033 | A | 12/1999 | Kelley et al. |
| 6,000,832 | A | 12/1999 | Franklin et al. |
| 6,001,016 | A | 12/1999 | Walker et al. |
| 6,003,762 | A | 12/1999 | Hayashida |
| 6,005,939 | A | 12/1999 | Fortenberry |
| 6,005,943 | A | 12/1999 | Cohen et al. |
| 6,006,205 | A | 12/1999 | Loeb et al. |
| 6,006,249 | A | 12/1999 | Leong |
| 6,009,411 | A | 12/1999 | Kepecs |
| 6,009,415 | A | 12/1999 | Shurling et al. |
| 6,009,442 | A | 12/1999 | Chen et al. |
| 6,010,404 | A | 1/2000 | Walker et al. |
| 6,012,049 | A | 1/2000 | Kawan |
| 6,012,088 | A | 1/2000 | Li |
| 6,012,983 | A | 1/2000 | Walker et al. |
| 6,014,439 | A | 1/2000 | Walker et al. |
| 6,014,635 | A | 1/2000 | Harris et al. |
| 6,014,636 | A | 1/2000 | Reeder |
| 6,014,638 | A | 1/2000 | Burge |
| 6,014,641 | A | 1/2000 | Loeb et al. |
| 6,014,645 | A | 1/2000 | Cunningham |
| 6,016,476 | A | 1/2000 | Maes et al. |
| 6,018,714 | A | 1/2000 | Risen |
| 6,018,718 | A | 1/2000 | Walker et al. |
| 6,024,640 | A | 2/2000 | Walker et al. |
| 6,026,398 | A | 2/2000 | Brown et al. |
| 6,026,429 | A | 2/2000 | Jones |
| 6,029,141 | A | 2/2000 | Bezos et al. |
| 6,029,153 | A | 2/2000 | Bauchner et al. |
| 6,029,890 | A | 2/2000 | Austin |
| 6,032,134 | A | 2/2000 | Weissman |
| 6,032,136 | A | 2/2000 | Brake, Jr. et al. |
| 6,032,147 | A | 2/2000 | Williams |
| 6,036,099 | A | 3/2000 | Leighton |
| 6,038,547 | A | 3/2000 | Casto |
| 6,038,552 | A | 3/2000 | Fleischl et al. |
| 6,042,006 | A | 3/2000 | Van Tilburg et al. |
| 6,044,362 | A | 3/2000 | Neely |
| 6,044,402 | A | 3/2000 | Jacobson et al. |
| 6,045,039 | A | 4/2000 | Stinson et al. |
| 6,047,268 | A | 4/2000 | Bartoli et al. |
| 6,049,778 | A | 4/2000 | Walker et al. |
| 6,049,782 | A | 4/2000 | Gottesman et al. |
| 6,049,835 | A | 4/2000 | Gagnon |
| 6,055,637 | A | 4/2000 | Hudson |
| 6,061,660 | A | 5/2000 | Eggleston et al. |
| 6,061,665 | A | 5/2000 | Bahreman |
| 6,064,987 | A | 5/2000 | Walker |
| 6,065,120 | A | 5/2000 | Laursen et al. |
| 6,065,675 | A | 5/2000 | Teicher |
| 6,067,531 | A | 5/2000 | Hoyt et al. |
| 6,069,968 | A | 5/2000 | Shaw et al. |
| 6,070,147 | A | 5/2000 | Harms et al. |
| 6,070,153 | A | 5/2000 | Simpson |
| 6,070,244 | A | 5/2000 | Orchier et al. |
| 6,073,105 | A | 6/2000 | Sutcliffe et al. |
| 6,073,113 | A | 6/2000 | Guinan |
| 6,075,519 | A | 6/2000 | Okatani et al. |
| 6,076,072 | A | 6/2000 | Libman |
| 6,081,790 | A | 6/2000 | Rosen |
| 6,081,810 | A | 6/2000 | Rosenzweig |
| 6,081,900 | A | 6/2000 | Subramaniam et al. |
| 6,085,168 | A | 7/2000 | Mori et al. |
| 6,088,444 | A | 7/2000 | Walker et al. |
| 6,088,451 | A | 7/2000 | He et al. |
| 6,088,683 | A | 7/2000 | Jalili |
| 6,088,686 | A | 7/2000 | Walker et al. |
| 6,088,700 | A | 7/2000 | Larsen |
| 6,091,817 | A | 7/2000 | Bertina et al. |

| | | | |
|---|---|---|---|
| 6,092,057 | A | 7/2000 | Zimmerman et al. |
| 6,092,192 | A | 7/2000 | Kanevsky et al. |
| 6,092,196 | A | 7/2000 | Reiche |
| 6,095,412 | A | 8/2000 | Bertina et al. |
| 6,098,070 | A | 8/2000 | Maxwell |
| 6,101,486 | A | 8/2000 | Roberts et al. |
| 6,104,716 | A | 8/2000 | Crichton et al. |
| 6,105,006 | A | 8/2000 | Davis et al. |
| 6,105,007 | A | 8/2000 | Norris |
| 6,105,012 | A | 8/2000 | Chang et al. |
| 6,105,865 | A | 8/2000 | Hardesty |
| 6,108,642 | A | 8/2000 | Findley |
| 6,111,858 | A | 8/2000 | Greaves et al. |
| 6,112,181 | A | 8/2000 | Shear |
| 6,115,641 | A | 9/2000 | Brown et al. |
| 6,115,642 | A | 9/2000 | Brown et al. |
| 6,115,690 | A | 9/2000 | Wong |
| 6,119,093 | A | 9/2000 | Walker et al. |
| 6,119,099 | A | 9/2000 | Walker et al. |
| 6,119,933 | A | 9/2000 | Wong et al. |
| 6,128,599 | A | 10/2000 | Walker et al. |
| 6,128,602 | A | 10/2000 | Northington et al. |
| 6,131,810 | A | 10/2000 | Weiss |
| 6,134,549 | A | 10/2000 | Regnier |
| 6,134,592 | A | 10/2000 | Montulli |
| 6,135,349 | A | 10/2000 | Zirkel |
| 6,138,106 | A | 10/2000 | Walker et al. |
| 6,138,118 | A | 10/2000 | Koppstein et al. |
| 6,138,911 | A | 10/2000 | Fredregill et al. |
| 6,141,651 | A | 10/2000 | Riley et al. |
| 6,141,666 | A | 10/2000 | Tobin |
| 6,144,946 | A | 11/2000 | Iwamura |
| 6,144,948 | A | 11/2000 | Walker et al. |
| 6,145,086 | A | 11/2000 | Bellemore et al. |
| 6,148,293 | A | 11/2000 | King |
| 6,151,584 | A | 11/2000 | Papierniak et al. |
| 6,154,750 | A | 11/2000 | Roberge et al. |
| 6,154,879 | A | 11/2000 | Pare et al. |
| 6,161,113 | A | 12/2000 | Mora et al. |
| 6,161,182 | A | 12/2000 | Nadooshan |
| 6,163,771 | A | 12/2000 | Walker et al. |
| 6,164,533 | A | 12/2000 | Barton |
| 6,169,974 | B1 | 1/2001 | Baumgartner et al. |
| 6,170,011 | B1 | 1/2001 | Beck |
| 6,178,408 | B1 | 1/2001 | Copple et al. |
| 6,178,511 | B1 | 1/2001 | Cohen et al. |
| 6,182,052 | B1 | 1/2001 | Fulton et al. |
| 6,182,059 | B1 | 1/2001 | Angotti et al. |
| 6,182,142 | B1 | 1/2001 | Win et al. |
| 6,182,220 | B1 | 1/2001 | Chen et al. |
| 6,182,225 | B1 | 1/2001 | Hagiuda et al. |
| 6,185,242 | B1 | 2/2001 | Arthur |
| 6,188,309 | B1 | 2/2001 | Levine |
| 6,189,029 | B1 | 2/2001 | Fuerst |
| 6,189,787 | B1 | 2/2001 | Dorf |
| 6,195,644 | B1 | 2/2001 | Bowie |
| 6,199,077 | B1 | 3/2001 | Inala et al. |
| 6,201,948 | B1 | 3/2001 | Cook |
| 6,202,005 | B1 | 3/2001 | Mahaffey |
| 6,202,054 | B1 | 3/2001 | Lawlor et al. |
| 6,202,066 | B1 | 3/2001 | Barkley |
| 6,202,151 | B1 | 3/2001 | Musgrave et al. |
| 6,202,158 | B1 | 3/2001 | Urano et al. |
| 6,208,978 | B1 | 3/2001 | Walker et al. |
| 6,208,984 | B1 | 3/2001 | Rosenthal |
| 6,213,391 | B1 | 4/2001 | Lewis |
| 6,216,115 | B1 | 4/2001 | Barrameda et al. |
| 6,219,639 | B1 | 4/2001 | Bakis et al. |
| 6,219,706 | B1 | 4/2001 | Fan |
| 6,222,914 | B1 | 4/2001 | McMullin |
| 6,223,168 | B1 | 4/2001 | McGurl et al. |
| 6,226,623 | B1 | 5/2001 | Schein et al. |
| 6,226,679 | B1 | 5/2001 | Gupta |
| 6,226,752 | B1 | 5/2001 | Gupta et al. |
| 6,227,447 | B1 | 5/2001 | Campisano |
| 6,230,148 | B1 | 5/2001 | Pare et al. |
| 6,243,688 | B1 | 6/2001 | Kalina |
| 6,243,689 | B1 | 6/2001 | Norton |
| 6,243,816 | B1 | 6/2001 | Fang et al. |
| 6,246,996 | B1 | 6/2001 | Stein et al. |
| 6,253,327 | B1 | 6/2001 | Zhang et al. |
| 6,253,328 | B1 | 6/2001 | Smith, Jr. |
| 6,256,664 | B1 | 7/2001 | Donoho et al. |
| 6,260,026 | B1 | 7/2001 | Tomida et al. |
| 6,266,648 | B1 | 7/2001 | Baker, III |
| 6,266,683 | B1 | 7/2001 | Yehuda et al. |
| 6,267,292 | B1 | 7/2001 | Walker et al. |
| 6,269,348 | B1 | 7/2001 | Pare et al. |
| 6,275,944 | B1 | 8/2001 | Kao et al. |
| 6,278,996 | B1 | 8/2001 | Richardson et al. |
| 6,289,322 | B1 | 9/2001 | Kitchen et al. |
| 6,289,324 | B1 | 9/2001 | Kawan |
| 6,292,786 | B1 | 9/2001 | Deaton et al. |
| 6,298,330 | B1 | 10/2001 | Gardenswartz et al. |
| 6,298,356 | B1 | 10/2001 | Jawahar et al. |
| 6,301,567 | B1 | 10/2001 | Leong et al. |
| 6,308,273 | B1 | 10/2001 | Goertzel et al. |
| 6,308,274 | B1 | 10/2001 | Swift |
| 6,311,275 | B1 | 10/2001 | Jin et al. |
| 6,315,195 | B1 | 11/2001 | Ramachandran |
| 6,317,834 | B1 | 11/2001 | Gennaro et al. |
| 6,317,838 | B1 | 11/2001 | Baize |
| 6,321,337 | B1 | 11/2001 | Reshef et al. |
| 6,324,524 | B1 | 11/2001 | Lent et al. |
| 6,327,573 | B1 | 12/2001 | Walker et al. |
| 6,327,575 | B1 | 12/2001 | Katz |
| 6,327,578 | B1 | 12/2001 | Linehan |
| 6,330,543 | B1 | 12/2001 | Kepecs |
| 6,332,126 | B1 | 12/2001 | Peirce et al. |
| 6,332,192 | B1 | 12/2001 | Boroditsky et al. |
| 6,334,108 | B1 | 12/2001 | Deaton et al. |
| 6,336,104 | B1 | 1/2002 | Walker et al. |
| 6,339,423 | B1 | 1/2002 | Sampson et al. |
| 6,341,724 | B2 | 1/2002 | Campisano |
| 6,343,279 | B1 | 1/2002 | Bissonette et al. |
| 6,343,323 | B1 | 1/2002 | Kalpio et al. |
| 6,345,261 | B1 | 2/2002 | Feidelson |
| 6,349,242 | B2 | 2/2002 | Mahaffey |
| 6,349,290 | B1 | 2/2002 | Horowitz et al. |
| 6,349,336 | B1 | 2/2002 | Sit et al. |
| 6,356,881 | B1 | 3/2002 | Milch et al. |
| 6,360,209 | B1 | 3/2002 | Loeb et al. |
| 6,360,250 | B1 | 3/2002 | Anupam et al. |
| 6,360,254 | B1 | 3/2002 | Linden et al. |
| 6,363,381 | B1 | 3/2002 | Lee et al. |
| 6,366,682 | B1 | 4/2002 | Hoffman et al. |
| 6,381,587 | B1 | 4/2002 | Guzelsu |
| 6,385,591 | B1 | 5/2002 | Mankoff |
| 6,385,652 | B1 | 5/2002 | Brown et al. |
| 6,401,125 | B1 | 6/2002 | Makarios et al. |
| 6,401,206 | B1 | 6/2002 | Khan et al. |
| 6,401,211 | B1 | 6/2002 | Brezak, Jr. et al. |
| 6,404,866 | B1 | 6/2002 | Hopper et al. |
| 6,405,175 | B1 | 6/2002 | Ng |
| 6,405,181 | B2 | 6/2002 | Lent et al. |
| 6,408,389 | B2 | 6/2002 | Grawrock et al. |
| 6,409,080 | B2 | 6/2002 | Kawagishi |
| 6,411,933 | B1 | 6/2002 | Maes et al. |
| 6,411,947 | B1 | 6/2002 | Rice et al. |
| 6,418,457 | B1 | 7/2002 | Schmidt et al. |
| 6,421,768 | B1 | 7/2002 | Purpura |
| 6,424,947 | B1 | 7/2002 | Tsuria et al. |
| 6,424,949 | B1 | 7/2002 | Deaton et al. |
| 6,424,951 | B1 | 7/2002 | Shurling et al. |
| 6,434,534 | B1 | 8/2002 | Walker et al. |
| 6,438,219 | B1 | 8/2002 | Karau et al. |
| 6,438,594 | B1 | 8/2002 | Bowman-Amuah |
| 6,438,666 | B2 | 8/2002 | Cassagnol et al. |
| 6,446,053 | B1 | 9/2002 | Elliott |
| 6,446,111 | B1 | 9/2002 | Lowery |
| 6,449,765 | B1 | 9/2002 | Ballard |
| 6,453,353 | B1 | 9/2002 | Win et al. |
| 6,460,141 | B1 | 10/2002 | Olden |
| 6,470,357 | B1 | 10/2002 | Garcia, Jr. et al. |
| 6,484,149 | B1 | 11/2002 | Jammes |
| 6,487,641 | B1 | 11/2002 | Cusson et al. |
| 6,490,601 | B1 | 12/2002 | Markus et al. |
| 6,493,677 | B1 | 12/2002 | Von Rosen et al. |

| | | | |
|---|---|---|---|
| 6,493,685 B1 | 12/2002 | Ensel et al. | |
| 6,496,855 B1 | 12/2002 | Hunt et al. | |
| 6,496,936 B1 | 12/2002 | French et al. | |
| 6,498,657 B1 | 12/2002 | Kuntz et al. | |
| 6,505,773 B1 | 1/2003 | Palmer et al. | |
| 6,507,912 B1 | 1/2003 | Matyas, Jr. et al. | |
| 6,510,464 B1 | 1/2003 | Grantges et al. | |
| 6,510,523 B1 | 1/2003 | Perlman et al. | |
| 6,513,019 B2 | 1/2003 | Lewis | |
| 6,516,302 B1 | 2/2003 | Deaton et al. | |
| 6,516,416 B2 | 2/2003 | Gregg et al. | |
| 6,519,763 B1 | 2/2003 | Kaufer et al. | |
| 6,526,404 B1 | 2/2003 | Slater et al. | |
| 6,532,284 B2 | 3/2003 | Walker et al. | |
| 6,535,855 B1 | 3/2003 | Cahill et al. | |
| 6,535,917 B1 | 3/2003 | Zamanzadeh et al. | |
| 6,535,980 B1 | 3/2003 | Kumar et al. | |
| 6,539,027 B1 | 3/2003 | Cambron | |
| 6,539,363 B1 | 3/2003 | Allgeier et al. | |
| 6,539,424 B1 | 3/2003 | Dutta | |
| 6,546,392 B1 | 4/2003 | Bahlmann | |
| 6,549,972 B1 | 4/2003 | Berstis et al. | |
| 6,557,039 B1 | 4/2003 | Leong et al. | |
| 6,560,581 B1 | 5/2003 | Fox et al. | |
| 6,564,189 B1 | 5/2003 | Nycz | |
| 6,567,791 B2 | 5/2003 | Lent et al. | |
| 6,571,216 B1 | 5/2003 | Garg et al. | |
| 6,574,348 B1 | 6/2003 | Venkatesan et al. | |
| 6,578,012 B1 | 6/2003 | Storey | |
| 6,580,814 B1 | 6/2003 | Ittycheriah et al. | |
| 6,581,040 B1 | 6/2003 | Wright et al. | |
| 6,584,505 B1 | 6/2003 | Howard et al. | |
| 6,584,508 B1 | 6/2003 | Epstein et al. | |
| 6,587,835 B1 | 7/2003 | Treyz et al. | |
| 6,589,291 B1 | 7/2003 | Boag et al. | |
| 6,592,044 B1 | 7/2003 | Wong et al. | |
| 6,594,640 B1 | 7/2003 | Postrel | |
| 6,607,127 B2 | 8/2003 | Wong | |
| 6,609,104 B1 | 8/2003 | Deaton et al. | |
| 6,609,106 B1 | 8/2003 | Robertson | |
| 6,609,113 B1 | 8/2003 | O'Leary et al. | |
| 6,609,125 B1 | 8/2003 | Layne et al. | |
| 6,609,198 B1 | 8/2003 | Wood et al. | |
| 6,609,654 B1 | 8/2003 | Anderson et al. | |
| 6,611,498 B1 | 8/2003 | Baker et al. | |
| 6,611,811 B1 | 8/2003 | Deaton et al. | |
| 6,611,819 B1 | 8/2003 | Oneda | |
| 6,618,579 B1 | 9/2003 | Smith et al. | |
| 6,618,806 B1 | 9/2003 | Brown et al. | |
| 6,623,415 B2 | 9/2003 | Gates et al. | |
| 6,624,761 B2 | 9/2003 | Fallon | |
| 6,631,849 B2 | 10/2003 | Blossom | |
| 6,640,302 B1 | 10/2003 | Subramaniam et al. | |
| 6,641,050 B2 | 11/2003 | Kelley et al. | |
| 6,647,376 B1 | 11/2003 | Farrar et al. | |
| 6,651,168 B1 | 11/2003 | Kao et al. | |
| 6,662,215 B1 | 12/2003 | Moskowitz et al. | |
| 6,668,321 B2 | 12/2003 | Nendell et al. | |
| 6,668,322 B1 | 12/2003 | Wood et al. | |
| 6,671,818 B1 | 12/2003 | Mikurak | |
| 6,675,261 B2 | 1/2004 | Shandony | |
| 6,678,664 B1 | 1/2004 | Ganesan | |
| 6,684,195 B1 | 1/2004 | Deaton et al. | |
| 6,684,212 B1 | 1/2004 | Day et al. | |
| 6,684,248 B1 | 1/2004 | Janacek et al. | |
| 6,684,384 B1 | 1/2004 | Bickerton et al. | |
| 6,687,222 B1 | 2/2004 | Albert et al. | |
| 6,687,245 B2 | 2/2004 | Fangman et al. | |
| 6,697,947 B1 | 2/2004 | Matyas, Jr. et al. | |
| 6,714,919 B1 | 3/2004 | Findley | |
| 6,714,987 B1 | 3/2004 | Amin et al. | |
| 6,718,313 B1 | 4/2004 | Lent et al. | |
| 6,718,482 B2 | 4/2004 | Sato et al. | |
| 6,718,535 B1 | 4/2004 | Underwood | |
| 6,721,743 B1 | 4/2004 | Sakakibara | |
| 6,725,269 B1 | 4/2004 | Megiddo | |
| 6,727,802 B2 | 4/2004 | Kelly et al. | |
| 6,735,572 B2 * | 5/2004 | Landesmann | 705/14.39 |
| 6,735,695 B1 | 5/2004 | Gopalakrishnan et al. | |
| 6,735,778 B2 | 5/2004 | Khoo et al. | |
| 6,738,779 B1 | 5/2004 | Shapira | |
| D490,840 S | 6/2004 | Arakaki et al. | |
| D491,186 S | 6/2004 | Arakaki et al. | |
| D491,953 S | 6/2004 | Arakaki et al. | |
| 6,751,654 B2 | 6/2004 | Massarani et al. | |
| 6,754,640 B2 | 6/2004 | Bozeman | |
| 6,754,833 B1 | 6/2004 | Black et al. | |
| 6,755,341 B1 | 6/2004 | Wong et al. | |
| 6,763,388 B1 | 7/2004 | Tsimelzon | |
| 6,766,370 B2 | 7/2004 | Glommen et al. | |
| 6,769,605 B1 | 8/2004 | Magness | |
| 6,772,146 B2 | 8/2004 | Khemlani et al. | |
| 6,775,783 B1 | 8/2004 | Trostle | |
| 6,785,810 B1 | 8/2004 | Lirov et al. | |
| D496,365 S | 9/2004 | Liu et al. | |
| 6,789,115 B1 | 9/2004 | Singer et al. | |
| 6,792,572 B1 | 9/2004 | Frohlick | |
| 6,795,809 B2 | 9/2004 | O'Brien et al. | |
| 6,795,812 B1 | 9/2004 | Lent et al. | |
| 6,804,786 B1 | 10/2004 | Chamley et al. | |
| 6,805,288 B2 | 10/2004 | Routhenstein et al. | |
| 6,807,285 B1 | 10/2004 | Iwamura | |
| 6,810,395 B1 | 10/2004 | Bharat | |
| D498,236 S | 11/2004 | Liu et al. | |
| 6,817,008 B2 | 11/2004 | Leford et al. | |
| 6,817,521 B1 | 11/2004 | Matada | |
| 6,819,219 B1 | 11/2004 | Bolle et al. | |
| 6,820,061 B2 | 11/2004 | Postrel | |
| 6,820,202 B1 | 11/2004 | Wheeler et al. | |
| 6,826,696 B1 | 11/2004 | Chawla et al. | |
| 6,829,586 B2 | 12/2004 | Postrel | |
| 6,832,202 B1 | 12/2004 | Schuyler et al. | |
| 6,832,587 B2 | 12/2004 | Wampula et al. | |
| 6,842,739 B2 | 1/2005 | Postrel | |
| 6,847,991 B1 | 1/2005 | Kurapati | |
| 6,856,970 B1 | 2/2005 | Campbell et al. | |
| RE38,717 E | 3/2005 | Bothwell | |
| 6,865,547 B1 | 3/2005 | Brake, Jr. et al. | |
| 6,868,391 B1 | 3/2005 | Hultgren | |
| 6,874,139 B2 | 3/2005 | Krueger et al. | |
| 6,889,198 B2 | 5/2005 | Kawan | |
| 6,892,231 B2 | 5/2005 | Jager | |
| 6,901,375 B2 | 5/2005 | Fernandez | |
| 6,901,406 B2 | 5/2005 | Nabe et al. | |
| 6,907,566 B1 | 6/2005 | McElfresh et al. | |
| 6,912,315 B1 | 6/2005 | Wong et al. | |
| 6,912,529 B1 | 6/2005 | Kolfman | |
| 6,915,271 B1 | 7/2005 | Meyer et al. | |
| 6,920,611 B1 | 7/2005 | Spaeth et al. | |
| 6,925,441 B1 * | 8/2005 | Jones et al. | 705/10 |
| 6,925,481 B2 | 8/2005 | Singhal et al. | |
| 6,931,382 B2 | 8/2005 | Laage et al. | |
| 6,934,848 B1 | 8/2005 | King et al. | |
| 6,937,976 B2 * | 8/2005 | Apte | 1/1 |
| 6,938,020 B2 | 8/2005 | Nakayama | |
| 6,938,048 B1 | 8/2005 | Jilk et al. | |
| 6,938,156 B2 | 8/2005 | Wheeler et al. | |
| 6,938,158 B2 | 8/2005 | Azuma | |
| 6,947,897 B2 | 9/2005 | Lortscher et al. | |
| 6,947,898 B2 | 9/2005 | Postrel | |
| 6,950,826 B1 | 9/2005 | Freeman | |
| 6,950,881 B1 | 9/2005 | Ndili | |
| 6,950,936 B2 | 9/2005 | Subramaniam et al. | |
| 6,950,940 B2 | 9/2005 | Wheeler et al. | |
| 6,954,932 B2 | 10/2005 | Nakamura et al. | |
| 6,957,337 B1 | 10/2005 | Chainer et al. | |
| 6,963,857 B1 | 11/2005 | Johnson | |
| 6,965,939 B2 | 11/2005 | Cuomo et al. | |
| 6,970,830 B1 | 11/2005 | Samra et al. | |
| 6,976,067 B2 | 12/2005 | Gusler et al. | |
| 6,976,164 B1 | 12/2005 | King et al. | |
| 6,978,378 B1 | 12/2005 | Koretz | |
| 6,980,962 B1 | 12/2005 | Arganbright et al. | |
| 6,983,421 B1 | 1/2006 | Lahti et al. | |
| 6,985,879 B2 | 1/2006 | Walker et al. | |
| 6,992,786 B1 | 1/2006 | Breding et al. | |
| 6,999,938 B1 | 2/2006 | Libman | |
| 7,003,476 B1 | 2/2006 | Samra et al. | |

7,003,565 B2 2/2006 Hind et al.
7,006,979 B1 2/2006 Samra et al.
7,006,983 B1 2/2006 Packes et al.
7,010,495 B1 3/2006 Samra et al.
7,010,512 B1 3/2006 Gillin et al.
7,013,286 B1 3/2006 Aggarwal et al.
7,020,696 B1 3/2006 Perry et al.
7,024,374 B1 * 4/2006 Day et al. ........................ 705/14
7,032,110 B1 4/2006 Su et al.
7,039,714 B1 5/2006 Blakley, III et al.
7,043,455 B1 5/2006 Cuomo et al.
7,047,222 B1 5/2006 Bush
7,051,199 B1 5/2006 Berson et al.
7,051,330 B1 5/2006 Kaler et al.
7,051,929 B2 5/2006 Li
7,058,817 B1 6/2006 Ellmore
7,069,434 B1 6/2006 Ilnicki et al.
7,072,864 B2 7/2006 Brake, Jr. et al.
7,073,059 B2 7/2006 Worely, Jr. et al.
7,076,453 B2 7/2006 Jammes et al.
7,080,036 B1 7/2006 Drummond et al.
7,089,203 B1 8/2006 Crookshanks
7,089,208 B1 8/2006 Levchin et al.
7,089,503 B1 8/2006 Bloomquist et al.
7,089,585 B1 8/2006 Dharmarajan
7,090,138 B2 8/2006 Rettenmyer et al.
7,092,905 B2 8/2006 Behrenbrinker et al.
7,092,992 B1 8/2006 Yu
7,093,020 B1 8/2006 Sungard
7,093,282 B2 8/2006 Hillhouse
7,103,556 B2 9/2006 Del Rey et al.
7,110,962 B2 9/2006 Amon et al.
7,117,239 B1 10/2006 Hansen
7,121,471 B2 10/2006 Beenau et al.
7,124,101 B1 10/2006 Mikurak
7,134,075 B2 11/2006 Hind
7,137,006 B1 11/2006 Grandcolas et al.
7,139,686 B1 11/2006 Critz
7,143,063 B2 11/2006 Lent et al.
7,152,242 B2 12/2006 Douglas
7,155,402 B1 12/2006 Dvorak
7,155,477 B2 12/2006 Blair et al.
7,161,506 B2 1/2007 Fallon
7,163,153 B2 1/2007 Blossom
7,165,256 B2 1/2007 Boudnik et al.
7,177,830 B2 2/2007 Shields et al.
7,185,094 B2 2/2007 Marquette et al.
7,188,181 B1 3/2007 Squier et al.
7,191,952 B2 3/2007 Blossom
7,195,154 B2 3/2007 Routhenstein
7,197,470 B1 3/2007 Arnett
7,203,909 B1 4/2007 Horvitz et al.
7,225,249 B1 5/2007 Barry
7,225,462 B2 5/2007 Bass et al.
7,225,464 B2 5/2007 Satyavolu et al.
7,228,155 B2 6/2007 Saunders
7,228,287 B1 * 6/2007 Samson et al. ............. 705/14.13
7,249,097 B2 7/2007 Hutchison et al.
7,249,099 B2 7/2007 Ling
7,249,112 B2 7/2007 Berardi et al.
7,266,835 B2 9/2007 Halbert
7,299,201 B2 11/2007 Jammes
7,302,585 B1 11/2007 Proudler et al.
7,312,707 B1 12/2007 Bishop et al.
7,313,802 B1 12/2007 Tomsen
7,321,864 B1 1/2008 Gendler
7,333,948 B2 2/2008 Bell et al.
7,340,773 B2 3/2008 Edwards
7,349,866 B2 3/2008 Schwarz, Jr.
7,356,516 B2 4/2008 Richey et al.
7,357,331 B2 4/2008 Blossom
7,370,011 B2 5/2008 Bennett
7,389,256 B1 6/2008 Adams et al.
7,395,241 B1 7/2008 Cook et al.
7,400,274 B2 7/2008 Fallon et al.
7,417,568 B2 8/2008 Fallon et al.
7,426,530 B1 9/2008 Rosko et al.
7,428,531 B2 9/2008 Barron et al.
7,440,923 B1 10/2008 Compiano
7,444,672 B2 10/2008 Ellmore
7,467,096 B2 12/2008 Antonucci et al.
7,472,171 B2 12/2008 Miller et al.
7,485,040 B2 * 2/2009 Walker et al. .................. 463/20
7,490,064 B2 2/2009 Allin et al.
7,493,288 B2 2/2009 Biship et al.
7,493,636 B2 2/2009 Kitsukawa et al.
7,496,950 B2 2/2009 Carley
7,506,804 B2 3/2009 Zajkowski et al.
7,506,806 B2 3/2009 Bonalle et al.
7,512,551 B2 3/2009 Postrel
7,523,385 B2 4/2009 Nguyen et al.
7,539,635 B1 5/2009 Peak et al.
7,545,931 B2 6/2009 Dillaway
7,549,170 B2 6/2009 Stubblefield et al.
7,580,857 B2 8/2009 VanFleet et al.
7,581,112 B2 8/2009 Brown et al.
7,587,363 B2 9/2009 Cataline et al.
7,599,856 B2 10/2009 Agrawal et al.
7,613,629 B2 11/2009 Antonucci et al.
7,630,935 B2 12/2009 Loeger et al.
7,640,205 B2 12/2009 Michelassi et al.
7,640,321 B2 12/2009 Yabe et al.
7,686,218 B2 3/2010 Hessburg et al.
7,689,504 B2 3/2010 Warren et al.
7,689,506 B2 3/2010 Fei et al.
7,707,111 B2 4/2010 Brake, Jr. et al.
7,729,925 B2 6/2010 Maritzen et al.
7,729,980 B2 6/2010 Mittenzwei et al.
7,747,866 B1 6/2010 Everhart
2001/0002487 A1 5/2001 Grawrock et al.
2001/0011250 A1 8/2001 Paltenghe et al.
2001/0011255 A1 8/2001 Asay et al.
2001/0012974 A1 8/2001 Mahaffey
2001/0016835 A1 8/2001 Hansmann et al.
2001/0023407 A1 9/2001 Liyanearachchi et al.
2001/0025253 A1 9/2001 Heintz et al.
2001/0027441 A1 10/2001 Wankmueller
2001/0027474 A1 10/2001 Nachman et al.
2001/0029464 A1 10/2001 Schweitzwer
2001/0029490 A1 10/2001 Inamochi
2001/0032183 A1 10/2001 Landry
2001/0032184 A1 10/2001 Tenembaum
2001/0032312 A1 10/2001 Runje et al.
2001/0034651 A1 10/2001 Marks et al.
2001/0034663 A1 10/2001 Teveler et al.
2001/0034718 A1 10/2001 Shaked et al.
2001/0034720 A1 10/2001 Armes
2001/0037243 A1 11/2001 Rouston et al.
2001/0037299 A1 11/2001 Nichols et al.
2001/0038033 A1 11/2001 Habib
2001/0039511 A1 11/2001 Duckworth et al.
2001/0044764 A1 11/2001 Arnold
2001/0047295 A1 11/2001 Tenembaum
2001/0047315 A1 11/2001 Siegel
2001/0047342 A1 11/2001 Cuervo
2001/0049628 A1 12/2001 Icho
2001/0051917 A1 12/2001 Bissonette et al.
2001/0054003 A1 12/2001 Chien
2001/0054059 A1 12/2001 Marks et al.
2001/0055391 A1 12/2001 Jacobs
2002/0002479 A1 * 1/2002 Almog et al. ..................... 705/8
2002/0002495 A1 1/2002 Ullman
2002/0002597 A1 1/2002 Morrell
2002/0004742 A1 1/2002 Willcocks et al.
2002/0007313 A1 1/2002 Mai et al.
2002/0007460 A1 1/2002 Azuma
2002/0010599 A1 1/2002 Levison
2002/0010621 A1 1/2002 Bell et al.
2002/0010627 A1 1/2002 Lerat
2002/0010668 A1 1/2002 Travis et al.
2002/0011517 A1 1/2002 Namekawa et al.
2002/0018585 A1 2/2002 Kim
2002/0019938 A1 2/2002 Aarons
2002/0023108 A1 2/2002 Daswani et al.
2002/0026365 A1 2/2002 Natanzon
2002/0029269 A1 3/2002 McCarty et al.
2002/0031230 A1 3/2002 Sweet et al.
2002/0032613 A1 3/2002 Buettgenbach et al.

2002/0032622 A1 3/2002 Petit et al.
2002/0032642 A1 3/2002 Chichilnisky
2002/0032650 A1 3/2002 Hauser et al.
2002/0032724 A1 3/2002 Shibusawa et al.
2002/0040344 A1 4/2002 Preiser et al.
2002/0042742 A1 4/2002 Glover et al.
2002/0042774 A1 4/2002 Ortiz et al.
2002/0042808 A1 4/2002 Smith et al.
2002/0046106 A1 4/2002 Ishibashi et al.
2002/0046110 A1 4/2002 Gallagher
2002/0046116 A1 4/2002 Hohle et al.
2002/0049605 A1 4/2002 Hagi
2002/0052778 A1 5/2002 Murphy et al.
2002/0052779 A1* 5/2002 Landesmann .................. 705/14
2002/0055874 A1 5/2002 Cohen
2002/0059103 A1 5/2002 Anderson et al.
2002/0059141 A1 5/2002 Davies et al.
2002/0059345 A1 5/2002 Wang et al.
2002/0062253 A1 5/2002 Dosh et al.
2002/0062257 A1 5/2002 Minamishin et al.
2002/0065735 A1 5/2002 Hatakama et al.
2002/0069104 A1 6/2002 Beach et al.
2002/0069105 A1 6/2002 do Rosario Botelho et al.
2002/0069109 A1 6/2002 Wendkos
2002/0069158 A1 6/2002 Larkin et al.
2002/0069172 A1 6/2002 Omshehe et al.
2002/0070270 A1 6/2002 Narita et al.
2002/0072931 A1 6/2002 Card
2002/0072974 A1 6/2002 Pugliese et al.
2002/0072984 A1 6/2002 Rothman et al.
2002/0073019 A1 6/2002 Deaton
2002/0077890 A1* 6/2002 LaPointe et al. ................ 705/14
2002/0077895 A1 6/2002 Howell
2002/0077904 A1 6/2002 Ali
2002/0077964 A1 6/2002 Brody et al.
2002/0077966 A1 6/2002 Harycki et al.
2002/0077978 A1 6/2002 O'Leary et al.
2002/0078382 A1 6/2002 Sheikh et al.
2002/0082920 A1 6/2002 Austin et al.
2002/0082962 A1 6/2002 Farris et al.
2002/0087349 A1 7/2002 Wong
2002/0087447 A1 7/2002 McDonald et al.
2002/0087471 A1* 7/2002 Ganesan et al. ................ 705/40
2002/0091567 A1 7/2002 Royston
2002/0095443 A1 7/2002 Kovack
2002/0099601 A1 7/2002 Farrell
2002/0099649 A1 7/2002 Lee et al.
2002/0099826 A1 7/2002 Summers et al.
2002/0099936 A1 7/2002 Kou et al.
2002/0104006 A1 8/2002 Boate et al.
2002/0104017 A1 8/2002 Stefan
2002/0107731 A1 8/2002 Teng
2002/0107788 A1 8/2002 Cunningham
2002/0111816 A1* 8/2002 Lortscher et al. ................. 705/1
2002/0111859 A1 8/2002 Sheldon et al.
2002/0111860 A1 8/2002 Jones
2002/0111861 A1 8/2002 Sakamoto et al.
2002/0111890 A1 8/2002 Sloan et al.
2002/0111891 A1 8/2002 Hoffman et al.
2002/0116266 A1 8/2002 Marshall
2002/0116331 A1 8/2002 Cataline et al.
2002/0120497 A1 8/2002 King
2002/0120571 A1 8/2002 Maung et al.
2002/0120846 A1 8/2002 Stewart et al.
2002/0123926 A1 9/2002 Bushold et al.
2002/0123946 A1 9/2002 Haworth et al.
2002/0123955 A1 9/2002 Andreski et al.
2002/0128903 A1 9/2002 Kernahan
2002/0128916 A1 9/2002 Beinecke
2002/0128977 A1 9/2002 Nambiar et al.
2002/0133401 A1 9/2002 Mount et al.
2002/0143614 A1 10/2002 MacLean et al.
2002/0143621 A1 10/2002 Donnelly et al.
2002/0143626 A1 10/2002 Voltmer et al.
2002/0143874 A1 10/2002 Marquette et al.
2002/0147633 A1 10/2002 Rafizadeh
2002/0147691 A1 10/2002 Davis et al.
2002/0152116 A1 10/2002 Yan et al.
2002/0152118 A1 10/2002 Hadjigeorgis
2002/0152123 A1 10/2002 Giordano et al.
2002/0152163 A1 10/2002 Bezos et al.
2002/0152179 A1 10/2002 Racov
2002/0156900 A1 10/2002 Marquette et al.
2002/0161630 A1 10/2002 Kern et al.
2002/0161641 A1 10/2002 Quinlan et al.
2002/0165808 A1 11/2002 Zamsky et al.
2002/0165949 A1 11/2002 Na
2002/0169671 A1 11/2002 Junger
2002/0174010 A1 11/2002 Rice, III
2002/0174011 A1 11/2002 Sanchez et al.
2002/0178056 A1 11/2002 Lim
2002/0178112 A1 11/2002 Goeller et al.
2002/0178113 A1 11/2002 Clifford et al.
2002/0178213 A1 11/2002 Parry
2002/0184507 A1 12/2002 Makower et al.
2002/0188478 A1 12/2002 Breeland et al.
2002/0188509 A1 12/2002 Ariff et al.
2002/0188511 A1 12/2002 Johnson et al.
2002/0188565 A1 12/2002 Nakamura et al.
2002/0188869 A1 12/2002 Patrick
2002/0191548 A1 12/2002 Ylonen et al.
2002/0194071 A1 12/2002 Yoshizaki et al.
2002/0194119 A1 12/2002 Wright et al.
2002/0198803 A1 12/2002 Rowe
2002/0198806 A1 12/2002 Blagg et al.
2002/0198807 A1 12/2002 Kobayashi et al.
2003/0001888 A1 1/2003 Power
2003/0004794 A1 1/2003 Hamilton
2003/0004803 A1 1/2003 Glover et al.
2003/0004809 A1 1/2003 Palcic et al.
2003/0005288 A1 1/2003 Moskowitz et al.
2003/0009374 A1 1/2003 Moodie et al.
2003/0009379 A1 1/2003 Narasimhan et al.
2003/0009393 A1 1/2003 Norris
2003/0009426 A1 1/2003 Ruiz-Sanchez
2003/0018523 A1 1/2003 Rappaport et al.
2003/0018915 A1 1/2003 Stoll
2003/0023557 A1 1/2003 Moore
2003/0023880 A1 1/2003 Edwards et al.
2003/0033252 A1 2/2003 Buttridge et al.
2003/0034388 A1 2/2003 Routhenstein et al.
2003/0036952 A1 2/2003 Panttaja et al.
2003/0037131 A1 2/2003 Verma
2003/0037142 A1 2/2003 Munger et al.
2003/0040964 A1 2/2003 Lacek
2003/0040995 A1 2/2003 Daddario et al.
2003/0041165 A1 2/2003 Spencer et al.
2003/0046173 A1 3/2003 Benjier et al.
2003/0046587 A1 3/2003 Bheemarasetti et al.
2003/0046589 A1 3/2003 Gregg
2003/0048888 A1 3/2003 Hopper et al.
2003/0050831 A1 3/2003 Klayh
2003/0051026 A1 3/2003 Carter et al.
2003/0055871 A1 3/2003 Roses
2003/0061093 A1 3/2003 Todd
2003/0061097 A1 3/2003 Walker et al.
2003/0061098 A1 3/2003 Meyer
2003/0061168 A1 3/2003 Routhenstein
2003/0065618 A1 4/2003 VanDeBoe, Jr.
2003/0069808 A1 4/2003 Cardno
2003/0070069 A1 4/2003 Belapurkar et al.
2003/0070084 A1 4/2003 Satomaa et al.
2003/0074580 A1 4/2003 Knouse et al.
2003/0079147 A1 4/2003 Hsieh et al.
2003/0083933 A1 5/2003 McAlear
2003/0083939 A1* 5/2003 Wohl .............................. 705/14
2003/0084002 A1 5/2003 Ericson et al.
2003/0084345 A1 5/2003 Bjornestad et al.
2003/0084647 A1 5/2003 Smith et al.
2003/0085286 A1 5/2003 Kelley et al.
2003/0088462 A1 5/2003 Carrither et al.
2003/0088470 A1 5/2003 Cuervo
2003/0088489 A1 5/2003 Peters et al.
2003/0088552 A1 5/2003 Bennett et al.
2003/0097298 A1 5/2003 Klimpl et al.
2003/0097574 A1 5/2003 Upton
2003/0101454 A1 5/2003 Ozer et al.
2003/0105688 A1 6/2003 Brown et al.

2003/0105689 A1 6/2003 Chandak et al.
2003/0105981 A1 6/2003 Miller et al.
2003/0110399 A1 6/2003 Rail
2003/0115100 A1 6/2003 Teicher
2003/0115160 A1 6/2003 Nowlin et al.
2003/0119642 A1 6/2003 Gates et al.
2003/0120544 A1 6/2003 Gritzbach et al.
2003/0125969 A1 7/2003 Kizer et al.
2003/0126011 A1 7/2003 Bryman et al.
2003/0130891 A1* 7/2003 Jacobs ........................... 705/14
2003/0131357 A1 7/2003 Kim
2003/0144902 A1 7/2003 Bowie
2003/0149594 A1 8/2003 Beazley et al.
2003/0149629 A1 8/2003 Claridge et al.
2003/0149756 A1 8/2003 Grieve et al.
2003/0154171 A1* 8/2003 Karp et al. ...................... 705/78
2003/0154403 A1 8/2003 Keinsley et al.
2003/0158776 A1 8/2003 Landesmann
2003/0158782 A1 8/2003 Thomson et al.
2003/0158818 A1 8/2003 George et al.
2003/0159072 A1 8/2003 Bellinger et al.
2003/0163700 A1 8/2003 Paatero
2003/0163733 A1 8/2003 Barriga-Caceres et al.
2003/0167199 A1 9/2003 Thomann et al.
2003/0167229 A1 9/2003 Ludwig et al.
2003/0171992 A1 9/2003 Blagg et al.
2003/0177067 A1 9/2003 Cowell et al.
2003/0182246 A1 9/2003 Johnson et al.
2003/0187787 A1 10/2003 Freund
2003/0191549 A1 10/2003 Otsuka et al.
2003/0195805 A1 10/2003 Storey
2003/0200141 A1 10/2003 Robison
2003/0200142 A1 10/2003 Hicks et al.
2003/0204460 A1 10/2003 Robinson et al.
2003/0205617 A1 11/2003 Allen et al.
2003/0208400 A1 11/2003 Kuo et al.
2003/0208439 A1 11/2003 Rast
2003/0212630 A1 11/2003 Kahr
2003/0212887 A1 11/2003 Walther et al.
2003/0216964 A1 11/2003 MacLean et al.
2003/0216967 A1 11/2003 Williams
2003/0216998 A1 11/2003 Chang et al.
2003/0217003 A1 11/2003 Weinflash et al.
2003/0218066 A1 11/2003 Fernandes et al.
2003/0220834 A1 11/2003 Leung et al.
2003/0225618 A1 12/2003 Hessburg et al.
2003/0225619 A1 12/2003 Dokken et al.
2003/0225688 A1 12/2003 Dobbins
2003/0229590 A1 12/2003 Byrne et al.
2003/0233255 A1 12/2003 Dirienzo
2003/0233278 A1 12/2003 Marshall
2003/0236712 A1 12/2003 Antonucci et al.
2004/0002916 A1 1/2004 Timmerman et al.
2004/0006487 A1 1/2004 Tari
2004/0010447 A1 1/2004 Asayama
2004/0010462 A1 1/2004 Moon et al.
2004/0015394 A1 1/2004 Mok et al.
2004/0019563 A1 1/2004 Sines et al.
2004/0029569 A1 2/2004 Khan et al.
2004/0031856 A1 2/2004 Atsmon et al.
2004/0039686 A1 2/2004 Klebanoff
2004/0039940 A1 2/2004 Cox et al.
2004/0044606 A1 3/2004 Buttridge et al.
2004/0049702 A1 3/2004 Subramaniam et al.
2004/0054931 A1 3/2004 Himmel et al.
2004/0064401 A1 4/2004 Palaghita et al.
2004/0078276 A1 4/2004 Shimogori
2004/0078324 A1 4/2004 Lonnberg et al.
2004/0078328 A1 4/2004 Talbert et al.
2004/0078332 A1 4/2004 Ferguson et al.
2004/0094624 A1 5/2004 Fernandes et al.
2004/0111363 A1 6/2004 Trench et al.
2004/0111371 A1 6/2004 Friedman
2004/0111610 A1 6/2004 Slick et al.
2004/0117409 A1 6/2004 Scahill et al.
2004/0117658 A1 6/2004 Klaes
2004/0122736 A1* 6/2004 Strock et al. .................... 705/14
2004/0122766 A1 6/2004 Brooks et al.
2004/0128248 A1 7/2004 Fujihara et al.
2004/0133787 A1 7/2004 Doughty et al.
2004/0138991 A1 7/2004 Song et al.
2004/0143526 A1 7/2004 Monasterio et al.
2004/0146159 A1 7/2004 Rosen
2004/0149544 A1 8/2004 Dal Ferro
2004/0153378 A1 8/2004 Perkowski
2004/0159700 A1 8/2004 Khan et al.
2004/0162773 A1 8/2004 Del Rey et al.
2004/0172358 A1 9/2004 Lent et al.
2004/0177036 A1 9/2004 Nutahara et al.
2004/0181441 A1 9/2004 Fung et al.
2004/0186773 A1 9/2004 George et al.
2004/0193540 A1 9/2004 Brown et al.
2004/0199406 A1 10/2004 Owens et al.
2004/0210498 A1 10/2004 Freund
2004/0210531 A1 10/2004 Barron et al.
2004/0215507 A1 10/2004 Levitt et al.
2004/0215514 A1 10/2004 Quinlan
2004/0225880 A1 11/2004 Mizrah
2004/0230843 A1 11/2004 Jansen
2004/0232223 A1 11/2004 Beenau et al.
2004/0236688 A1 11/2004 Bozeman
2004/0239481 A1 12/2004 Beenau
2004/0243468 A1 12/2004 Cohagan et al.
2004/0243506 A1 12/2004 Das
2004/0249689 A1 12/2004 Naraki et al.
2004/0249710 A1 12/2004 Smith et al.
2004/0249712 A1 12/2004 Brown et al.
2004/0249764 A1 12/2004 Delizt et al.
2004/0252012 A1 12/2004 Beenau et al.
2004/0254991 A1 12/2004 Malik et al.
2005/0004839 A1 1/2005 Bakker et al.
2005/0004864 A1 1/2005 Lent et al.
2005/0006286 A1 1/2005 Fery et al.
2005/0015490 A1 1/2005 Saare et al.
2005/0021363 A1 1/2005 Stimson et al.
2005/0021405 A1 1/2005 Agarwal
2005/0021457 A1 1/2005 Johnson et al.
2005/0023346 A1 2/2005 Bakker et al.
2005/0033619 A1 2/2005 Barnes et al.
2005/0033637 A1 2/2005 Underwood
2005/0035847 A1 2/2005 Bonalle et al.
2005/0040242 A1 2/2005 Beenau et al.
2005/0049965 A1 3/2005 Jen
2005/0055270 A1 3/2005 Broe
2005/0055306 A1 3/2005 Miller et al.
2005/0060579 A1 3/2005 Dickelman et al.
2005/0065877 A1 3/2005 Cleary et al.
2005/0066037 A1 3/2005 Song et al.
2005/0071225 A1 3/2005 Bortolin et al.
2005/0071226 A1 3/2005 Nguyen et al.
2005/0071227 A1 3/2005 Hammad et al.
2005/0071637 A1 3/2005 Shirakawa
2005/0075889 A1 4/2005 Gomes et al.
2005/0077349 A1 4/2005 Bonalle et al.
2005/0080672 A1 4/2005 Courtion et al.
2005/0080747 A1 4/2005 Anderson et al.
2005/0082362 A1 4/2005 Anderson et al.
2005/0086103 A1 4/2005 Agura et al.
2005/0086160 A1 4/2005 Wong et al.
2005/0086166 A1 4/2005 Monk et al.
2005/0086177 A1 4/2005 Anderson et al.
2005/0091104 A1 4/2005 Abraham
2005/0091126 A1 4/2005 Junger
2005/0091138 A1 4/2005 Awatsu
2005/0091492 A1 4/2005 Benson et al.
2005/0096976 A1 5/2005 Nelms
2005/0097033 A1 5/2005 Pretell et al.
2005/0102178 A1 5/2005 Phillips et al.
2005/0108090 A1 5/2005 Takeda et al.
2005/0108102 A1 5/2005 York
2005/0108151 A1 5/2005 York
2005/0114254 A1 5/2005 Condie
2005/0119938 A1 6/2005 Smith et al.
2005/0120180 A1 6/2005 Schornbach et al.
2005/0125292 A1 6/2005 Kassab et al.
2005/0125295 A1 6/2005 Tidwell et al.
2005/0125296 A1 6/2005 Tidwell et al.
2005/0125315 A1 6/2005 Munoz et al.

| | | | |
|---|---|---|---|
| 2005/0125337 | A1 | 6/2005 | Tidwell et al. |
| 2005/0125338 | A1 | 6/2005 | Tidwell et al. |
| 2005/0125339 | A1 | 6/2005 | Tidwell et al. |
| 2005/0125350 | A1 | 6/2005 | Tidwell et al. |
| 2005/0125351 | A1 | 6/2005 | Tidwell et al. |
| 2005/0125360 | A1 | 6/2005 | Tidwell et al. |
| 2005/0131721 | A1 | 6/2005 | Doctorow et al. |
| 2005/0131761 | A1 | 6/2005 | Trika et al. |
| 2005/0131792 | A1 | 6/2005 | Rowe |
| 2005/0137982 | A1 | 6/2005 | Michelassi et al. |
| 2005/0144071 | A1 | 6/2005 | Monahan et al. |
| 2005/0144074 | A1 | 6/2005 | Fredregill et al. |
| 2005/0144105 | A1 | 6/2005 | Czyzewski |
| 2005/0144143 | A1 | 6/2005 | Freiberg |
| 2005/0149386 | A1 | 7/2005 | Agura et al. |
| 2005/0149393 | A1 | 7/2005 | Leof |
| 2005/0149440 | A1 | 7/2005 | Michelassi et al. |
| 2005/0154664 | A1 | 7/2005 | Guy et al. |
| 2005/0159986 | A1 | 7/2005 | Breeland et al. |
| 2005/0160003 | A1 | 7/2005 | Berardi et al. |
| 2005/0160051 | A1 | 7/2005 | Johnson |
| 2005/0167342 | A1 | 8/2005 | Vullriede et al. |
| 2005/0171839 | A1 | 8/2005 | Corriere |
| 2005/0171842 | A1 | 8/2005 | Tien et al. |
| 2005/0171898 | A1 | 8/2005 | Bishop et al. |
| 2005/0171901 | A1 | 8/2005 | Rosenblatt et al. |
| 2005/0177503 | A1 | 8/2005 | Thomas |
| 2005/0177523 | A1 | 8/2005 | Weiss et al. |
| 2005/0182654 | A1 | 8/2005 | Abolfathi et al. |
| 2005/0182735 | A1 | 8/2005 | Zager et al. |
| 2005/0187820 | A1 | 8/2005 | Mohan |
| 2005/0192862 | A1 | 9/2005 | Modi |
| 2005/0193056 | A1 | 9/2005 | Schaefer et al. |
| 2005/0193208 | A1 | 9/2005 | Charrette et al. |
| 2005/0197904 | A1 | 9/2005 | Baron et al. |
| 2005/0198634 | A1 | 9/2005 | Nielsen et al. |
| 2005/0199708 | A1 | 9/2005 | Friedman |
| 2005/0203824 | A1 | 9/2005 | Freud et al. |
| 2005/0203857 | A1 | 9/2005 | Friedman |
| 2005/0205666 | A1 | 9/2005 | Ward et al. |
| 2005/0206499 | A1 | 9/2005 | Fisher |
| 2005/0209917 | A1 | 9/2005 | Anderson et al. |
| 2005/0216346 | A1 | 9/2005 | Kusumoto et al. |
| 2005/0216421 | A1 | 9/2005 | Barry et al. |
| 2005/0222906 | A1 | 10/2005 | Chen |
| 2005/0234769 | A1 | 10/2005 | Jain et al. |
| 2005/0234773 | A1 | 10/2005 | Hirst et al. |
| 2005/0234789 | A1 | 10/2005 | Czyzewski et al. |
| 2005/0240474 | A1 | 10/2005 | Li |
| 2005/0240477 | A1 | 10/2005 | Friday et al. |
| 2005/0240916 | A1 | 10/2005 | Sandrew |
| 2005/0242179 | A1 | 11/2005 | Warwick |
| 2005/0246289 | A1 | 11/2005 | Alexander et al. |
| 2005/0246627 | A1 | 11/2005 | Sayed |
| 2005/0251446 | A1 | 11/2005 | Jiang et al. |
| 2005/0251470 | A1 | 11/2005 | Sullivan |
| 2005/0256794 | A1 | 11/2005 | Colby |
| 2005/0256802 | A1 | 11/2005 | Ammermann et al. |
| 2005/0261916 | A1 | 11/2005 | McCall et al. |
| 2005/0261995 | A1 | 11/2005 | Phelan |
| 2005/0267800 | A1 | 12/2005 | Tietzen et al. |
| 2005/0273386 | A1 | 12/2005 | Weidner |
| 2005/0273387 | A1 | 12/2005 | Previdi |
| 2005/0273425 | A1 | 12/2005 | Yamazaki |
| 2005/0278215 | A1 | 12/2005 | Seele, Jr. |
| 2005/0278641 | A1 | 12/2005 | Mansour et al. |
| 2005/0283429 | A1 | 12/2005 | Bates et al. |
| 2005/0288998 | A1 | 12/2005 | Verma et al. |
| 2005/0289003 | A1 | 12/2005 | Thompson et al. |
| 2005/0289051 | A1 | 12/2005 | Allin et al. |
| 2006/0004629 | A1 | 1/2006 | Neemann et al. |
| 2006/0005039 | A1 | 1/2006 | Hsieh |
| 2006/0010033 | A1 | 1/2006 | Thomas |
| 2006/0010034 | A1 | 1/2006 | Sparks |
| 2006/0011719 | A1 | 1/2006 | Lehtonen et al. |
| 2006/0015463 | A1 | 1/2006 | Gupta et al. |
| 2006/0020507 | A1 | 1/2006 | Sagey |
| 2006/0020783 | A1 | 1/2006 | Fisher |
| 2006/0026073 | A1 | 2/2006 | Kenny et al. |
| 2006/0029261 | A1 | 2/2006 | Hoffman et al. |
| 2006/0031718 | A1 | 2/2006 | Thornhill et al. |
| 2006/0036553 | A1 | 2/2006 | Gupta et al. |
| 2006/0041540 | A1 | 2/2006 | Shannon et al. |
| 2006/0053056 | A1 | 3/2006 | Alspach-Gross et al. |
| 2006/0064329 | A1 | 3/2006 | Abolfathi et al. |
| 2006/0080230 | A1 | 4/2006 | Freiberg |
| 2006/0080243 | A1 | 4/2006 | Kemper et al. |
| 2006/0080254 | A1 | 4/2006 | Chigira et al. |
| 2006/0095350 | A1 | 5/2006 | Hall et al. |
| 2006/0116949 | A1 | 6/2006 | Wehunt et al. |
| 2006/0122943 | A1 | 6/2006 | Mann, III et al. |
| 2006/0143077 | A1 | 6/2006 | Prorock |
| 2006/0143117 | A1 | 6/2006 | Chigira et al. |
| 2006/0149671 | A1 | 7/2006 | Nix et al. |
| 2006/0161478 | A1 | 7/2006 | Turner et al. |
| 2006/0173706 | A1 | 8/2006 | Allin et al. |
| 2006/0249574 | A1 | 11/2006 | Brown et al. |
| 2006/0259766 | A1 | 11/2006 | Rasti |
| 2006/0261927 | A1 | 11/2006 | Kelly et al. |
| 2006/0271397 | A1 | 11/2006 | Allin et al. |
| 2006/0271477 | A1 | 11/2006 | Allin et al. |
| 2006/0271478 | A1 | 11/2006 | Allin et al. |
| 2006/0271479 | A1 | 11/2006 | Allin et al. |
| 2006/0271480 | A1 | 11/2006 | Allin et al. |
| 2006/0274970 | A1 | 12/2006 | Seki et al. |
| 2007/0011089 | A1 | 1/2007 | DeSchryver |
| 2007/0019806 | A1 | 1/2007 | Conley et al. |
| 2007/0034700 | A1 | 2/2007 | Poidomani et al. |
| 2007/0043681 | A1 | 2/2007 | Morgan et al. |
| 2007/0078771 | A1 | 4/2007 | Allin et al. |
| 2007/0088950 | A1 | 4/2007 | Wheeler et al. |
| 2007/0136211 | A1 | 6/2007 | Brown et al. |
| 2007/0156521 | A1 | 7/2007 | Yates |
| 2007/0179883 | A1 | 8/2007 | Questembert |
| 2007/0186252 | A1 | 8/2007 | Maggio |
| 2007/0192618 | A1 | 8/2007 | Ellmore |
| 2007/0203850 | A1 | 8/2007 | Singh et al. |
| 2007/0208671 | A1 | 9/2007 | Brown et al. |
| 2007/0215688 | A1 | 9/2007 | Routhenstein |
| 2007/0234408 | A1 | 10/2007 | Burch et al. |
| 2007/0234409 | A1 | 10/2007 | Eisen |
| 2007/0265924 | A1 | 11/2007 | Schwarz |
| 2007/0283436 | A1 | 12/2007 | Duffield et al. |
| 2007/0295803 | A1 | 12/2007 | Levine et al. |
| 2008/0010202 | A1 | 1/2008 | Schwarz |
| 2008/0133350 | A1 | 6/2008 | White et al. |
| 2008/0184315 | A1 | 7/2008 | Ellis et al. |
| 2008/0262915 | A1 | 10/2008 | Gojkovic et al. |
| 2008/0320567 | A1 | 12/2008 | Shulman et al. |
| 2009/0043651 | A1 | 2/2009 | Schwarz |
| 2009/0100508 | A1 | 4/2009 | Labaton |
| 2009/0112639 | A1 | 4/2009 | Robinson |
| 2009/0150937 | A1 | 6/2009 | Ellis et al. |
| 2009/0171778 | A1 | 7/2009 | Powell |
| 2009/0192940 | A1 | 7/2009 | Mann, III et al. |
| 2009/0228362 | A1 | 9/2009 | Lapsley et al. |
| 2009/0313110 | A1 | 12/2009 | Asai et al. |
| 2010/0057551 | A1 | 3/2010 | Blaisdell |
| 2010/0057553 | A1 | 3/2010 | Ameiss et al. |

FOREIGN PATENT DOCUMENTS

| | | |
|---|---|---|
| DE | 19731293 | 1/1999 |
| EP | 0855659 | 7/1998 |
| EP | 0884877 | 12/1998 |
| EP | 0917119 | 5/1999 |
| EP | 1014318 | 6/2000 |
| EP | 1022664 | 7/2000 |
| EP | 1056043 | 11/2000 |
| EP | 0590861 | 1/2001 |
| EP | 1089516 | 4/2001 |
| JP | 59146347 A | 8/1984 |
| JP | 10187467 | 7/1998 |
| JP | 11078891 A | 3/1999 |
| JP | 2000-324329 | 11/2000 |
| JP | 2001-134672 | 5/2001 |
| JP | 2005-242976 | 9/2005 |
| WO | WO 97/43736 | 11/1997 |
| WO | WO 98/10368 | 3/1998 |

| | | | |
|---|---|---|---|
| WO | WO 98-29822 | | 7/1998 |
| WO | WO 99/39291 | | 8/1999 |
| WO | WO 99/40507 | A1 | 8/1999 |
| WO | WO 99/52051 | | 10/1999 |
| WO | WO 00/68858 | | 11/2000 |
| WO | WO 01/11526 | | 2/2001 |
| WO | WO 01/18656 | A1 | 3/2001 |
| WO | WO 01/35355 | | 5/2001 |
| WO | WO 01/43084 | | 6/2001 |
| WO | WO 01/88659 | | 11/2001 |
| WO | WO 02/17082 | A1 | 2/2002 |
| WO | WO 2004/079603 | | 9/2004 |
| WO | WO 2005/101975 | | 11/2005 |
| WO | WO 2006/011904 | A2 | 2/2006 |
| WO | WO 2006/060370 | | 6/2006 |
| WO | WO 2006/105092 | | 10/2006 |
| WO | WO 2006/116772 | | 11/2006 |

OTHER PUBLICATIONS

"Fact Sheet 24: Protecting Financial Privacy Draft Review Copy Dec. 14, 2000: We invite your input" ( 7 pages).*

ECharge, eCharge Corporation, www.echarge.com, Dec. 3, 1999.

Tracy Pletz et al., Summary of the at your risk architecture, Jun. 3, 1999.

Siebel, Siebel: Ensuring Customer Success, www.siebel.com, Nov. 17, 1999.

OMG, Welcome to OMG's CORBA for Beginners Page!, www.omg.com, May 25, 1999.

Sun MicroSystems, Inc., Schema for Representing CORBA Objects in an LDAP directory, May 21, 1999.

OMG, Library, www.omg.com, May 25, 1999.

OMG, What is CORBA?, www.omg.com, May 25, 1999.

Overview of CORBA, www.omg.com, May 25, 1999.

JAVA, JAVA™ Technology in the Real World, java.sun.com, May 21, 1999.

JAVA, JAVA™ Servlet API, java.sun.com, May 21, 1999.

JAVA, Staying in Touch with JNDI, java.sun.com, May 21, 1999.

JAVA, JAVA™ Remote Method Invocation (RMI) Interface, java.sun.com, May 21, 1999.

JAVA, Banking on JAVA™ Technology, java.sun.com, May 21, 1999.

JAVA, The JDBC Data Access API, java.sun.com, May 21, 1999.

Anne Thomas, Enterprise JAVABEANS™ Technology: Server Component Model for the Java™ platform, java.sun.com, May 21, 1999.

S. R. Hiremath, Numerical Credit Scoring Model, Operations Research Bulletin, WA13.16, Apr. 30, 1975.

Reuters, Getting Smart with Java: Sun Micro Says American Express to Use Java for Smart Card, www.abcnew.go.com/sciences/tech, Jun. 6, 2000.

David Bank, Cash, Check, Charge—What's Next?, Seattle Times, Mar. 6, 1998.

Gerry Vandenengel, Cardson the Internet: Advertising on a $3 Bill, Industry Intelligence, Feb. 1, 1995.

Kim A. Strassel, Dutch Software Concern Experiments with Electronic 'Cash' in Cyberspace, Wall Street Journal, Apr. 17, 1995.

Jeffrey Kutler, Cash Card Creator Looking Beyond Mondex, Feb. 9, 1995.

David Post, E-Cash: Can't Live With It, Can't Live Without It, The American Lawyer, pp. 116-117, Mar. 1, 1996.

Russell Mitchell, Cyberspace: Crafting Software . . . , Business Week, pp. 78-86, Feb. 27, 1995.

Jeffrey Kutler, A Different Drummer on the Data Highway, American Banker, May 12, 1995.

Stephen Eppmt, A pLayer Goes After Big Bucks in Cyberspace, American Banker, May 5, 1995.

Robert Barnham, Network Brings Together Producers and Companies, Bests Review Feb. 1, 1994.

Vanessa Houlder, OFT Gives the Individual Top Priority: Report Calls for Deregulation of Business Lending, The Financial Times, Jun. 8, 1994.

Kennedy Maiz, Fannie Mae on the Web, Newsbyte, May 8, 1995.

Anne Knowles, Improved Internet Security Enabling On-Line Commerce, PC Week, Mar. 20, 1995.

Aversion Therapy: Banks Overcoming Fear of the Net to Develop Safe Internet-based Payment System w/ Netscape Communicator, Network World, Dec. 12, 1994.

Don Clark, Microsoft, Visa to Jointly Develop PC Electronic-Shopping Software, Wall Street Journal, The, B9, Nov. 9, 1994.

Understanding Product Data Management, Hewlett-Packard Company, Apr. 26, 1999.

Getting Started: Specific GE TPN Post Service Use Guidelines, GE, Apr. 26, 1999.

Resource Center: Consolidated Edison Selects GE TPN Post, GE, Apr. 26, 1999.

ThomasNet, Thomas Publishing Company, Apr. 26, 1999.

SoluSource: For Engineers by Engineers, Thomas Publishing Company, Apr. 26, 1999.

Harris InfoSource, Apr. 26, 1999.

Welcome to MUSE, MUSE Technologies, Apr. 26, 1999.

Product Data Integration Technologies, Inc., PDIT, Apr. 26, 1999.

SBA: Pro-Net, SBA, Apr. 1, 1999.

FreeMarkets, FreeMarkets Online, Inc., Apr. 26, 1999.

Associates National Bank (DE) Credit Card Services, The Associates, www.theassocitheassociates.atescomcom/consumer/credit_cards/rnain.html, Apr. 6, 1999.

At Your Request, Wingspanbankcom, Sep. 28, 1999.

Robyn Meredith, Internet bank moves closer to virtual reality, USA Today, May 5, 1995.

Marvin Sirbu and J.D. Tygar, NetBill: An Internet Commerce System Optimized for Network Delivered Services, http://www.ini.cmu.edu:80/netbill, pp. 1-12, Feb. 27, 1995.

The check is in the email., Information Today, vol. 12, No. 3, Mar. 1, 1995, ISSN: 8755-6286.

The Gale Group, G&D America's Multi-application Smart Card Selected for Combined Payroll and 'Virtual Banking' Program in Mexico, wysiwyg://0/http://www.dialogclassic.com/history, Business Wire, Apr. 24, 1998, p. 424-1047.

Richard Mitchell, Netlink Goes After an Unbanked Niche, wysiwyg://0/http://www.dialogclassic.com/history, ISSN: 1093-1279, Sep. 1999.

Hasting et al., A Case Study of Authenticated and Secure File Transfer The Iowa Campaign Finance Reporting System (1997).

Epper, A Player Goes After Big Bucks in Cyberspace, American Banker, vol. 160, No. 86, ISSN 0002-7561, May 5, 1995, p. 17.

Berry et al, A potent new tool for selling databse, Business Week, Cover Story, Sep. 5, 1994, pp. 56-62.

Alshawi M. et. al., An IFC Web Based Collaborative Construction Computer Environment Wisper (1999).

Applets, java.sun.com, May 21, 1999.

Butterworth, 'Automating the Business Process of Mission Critical Distributed Applications'; Forte Software, Inc.; Apr. 1997.

Bechtel Construction Operations Incorporated Standardizes on Primavera's Expedition Contract Management Software, Business Wire, Jul. 27, 1999.

Fusaro, Roberta, Builders Moving to Web tools Computerworld, Nov. 16, 1998, vol. 32, No. 46, pp. 51, 53.

Microsoft, CNBC on MSN Money Microsoft Money 2003 Deluxe (2003).

Anonymous, CORBA Overview, arch2.htm at pent21.infosys.tuwien.ac.at, May 25, 1999.

Calyx Software, Point for Windows Version 3.x Interface Marketing Guide, Rev. Dec. 8, 1999, Copyright 1999.

Vandenengel, Cards on the Internet Advertising on a $3 Bill, Industry Intelligence, Feb. 1, 1995, pp. 46-48.

Marlin, Chasing Document Management, Inform, vol. 13, No. 4, Apr. 199, pp. 76-82.

Consortium Created to Manage Common Electronic Purse Specifications, http//www.visa.com/av/news/PRmisc051199.vhtml, printed Feb. 23, 2001.

Civitello Jr., Construction Operations Manual of Policies and Procedures, Third Edition, 2000.

Marchman, Construction Scheduling with Primavera Project Planner, May 25, 1999.

Chester, Cross-platform integration with XML, and SOAP, IT PTO Sep. 10, 2001.

Friedman, Dictionary of Business Terms, Barron's Third Edition, Copyright 2000.
Seibert, Paul, Facilities Planning & Design for Financial Institutions Bankline Publications, 1996, ISBN 1-55738-780-X.
Owen, David, Facilities Planning & Relocation RSMeans, ISBN 0-87629-281-3 (1993).
FreeMarkets, Interop Enterprise Award Winner for FreeMarkets Web Applications, Copyright 1999.
Larsen, Amy, Internet goes to Work for Builders, InterWeek, Nov. 16, 1998, Issue 741.
Radosevich, Is Work Flow Working?, CNN.com, Apr. 6, 1999 at <http//www.cnn.com/TECHcomputing/9904/06/workflow/ent.idg, p. 1 of 5, retrieved from the internet on Nov. 28, 2005.
Frank, Beyond Direct Mail, Credit Card Management, vol. 9, Iss. 5, Aug. 1996, 4pgs.
Kilian-Kehr, Mobile Security with Smartcards, Dissertation, Apr. 8, 2002.
Kristol, HTTP Cookies Standards, Privacy, and Politics, ACM Transactions on Internet Technology, vol. 1, No. 2,p. 151-198, Nov. 2001.
Li et al., Combined Coherence and Prefetching Mechanisms for Effective Web Caching, IEEE, p. 3034-3038, 2001.
Myers, The Wired World of Investment Information, Nation's Business, Washington, vol. 85, Iss. 3, p. 58, Mar. 1997.
Lacity, et al., The Information Systems Outsourcing Bandwagon, Sloan Management Review, vol. 35, No. 1, Fall 1993, p. 73-86.
Method of Protecting Data on A Personal Computer, IBM Corporation, TDB 11-85, Order 85A 62426, Nov. 1, 1995, p. 2530.
Nelte et al., Cookies Weaving the Web into a State, Crossroads, vol. 7, Issue 1, ACM Press, 6 pages, Fall 2000.
Nowlin, Construction Financing to Build Your Own Home, First Edition, Jerry L. Nowlin Consulting, Inc., ISBN 0962864307, Jul. 1990.
Omware, Inc., Web Pages, Feb. 2000, Retrieved from http//web.archive.org/web20000226033405/www.omware.com/products.html, Retrieved from the Internet on Nov. 28, 2005.
Youll, James, Peer to Peer Transactions in Agent Mediated Electronic Commerce (2001).
Harris, Planning Using Primavera Project Planner P3 Version 3.0, User Guide, Copyright 1999 by Eastwood Harry Pty Ltd., 1999.
Johnston, Pondering Passport Do You Trust Microsoft With Your Data?, www.pcworld.com/resource/printable/article/0.aid,63244,00.asp, Sep. 24, 2001.
Primavera Systems, Inc., Primavera Expedition User Guide, Version 6.0, Primavera Systems, Inc., 1998.
Primavera Systems Delivers Expedition Express,Business Wire, Feb. 23, 1999.
Primavera Systems, Inc.—How the World Manages Projects, Expedition Contract Control Software, www.primavera.com, Jun. 23, 2005.
Primavera and PurchasePro.com to Create E-Commerce Marketplace for Construction Industry, Primavera Ships P3, version 3.0, www.purchasepro.com/, Sep. 21, 1999, pp. 1-3.
Van Collie, Shimon Craig, Problem Disbursement Control Needed Construction Loan Tool from PriMerit NewTrend (1990).
Kormann, Risks of the Passport Single Sign-on Protocol, Computer Networks, Elsevier Science Press, vol. 33, Sep. 20, 2003, pp. 51-58.
Jepsen, SOAP Cleans up interoperability problems on the web, IT PTO, Jan./Feb. 2001.
Safe Single-Sign-On Protocol with Minimal Password Exposure No Decryption and Technology Adaptivity, IBM Corporation, TDB 03-95, Order 95A, Mar. 1, 1995, pp. 245-248.
Deckmyn, Dominique, San Francisco manages $45M project via web-based Service, Computerworld, Aug. 9, 1999, vol. 33, No. 32, p. 14.
Jakobsson et al., Secure and lightweight advertising on the web, Computer Networks, 31 (1999) 1101-1109.
Servlet/Applet/HTML Authentication Process with Single Sign-On, IBM Corporation, IBM Order 00A6004, Jan. 1, 2000.
Shibata, Seventh International Conference on Parallel and Distributed Systems Workshops, IEEE Computer Society, Jul. 4-7, 2000.
SmartAxis, How it works, http//www.smartaxis.co.uk/seller/howitworks.html, printed on Feb. 23, 2001.
Mosig, Richard, Software Review the Construction Project Manager Cost Engineering, Jan. 1996, vol. 38, No. 1, pp. 7-8.
Hernandez, Tomas et al., Software Solutions Building Design & Construction, Nov. 1999, vol. 40, No. 11, pp. 38-40.
Summary of The At Your Request Architecture, First USA Bank Confidential and Proprietary, Apr. 2, 1999, pp. 1-8.
Taylor, Telecommunications Demand Analysis in Transition, Proceedings of the 31st Hawaii International Conference on System Sciences, vol. 5, Jan. 6-9, 1998, pp. 409-415.
Temporary Global Passwords, IBM Corporation, IBM TDB v36, n3, 03-93, Order 93A 60636, Mar. 1, 1993, pp. 451-454.
Cotts, David, The Facility Management Handbook Second Edition AMACM, 1998, ISBN 0-8144-030-8.
Carden, Philip, The New Face of Single Sign-on, Network Computing, http//www.networkcomputing.com, printed Dec. 29, 2000, 4 pages.
Ritz, Total Construction Project Management, McGraw-Hill, 1994.
Yee, Bennet, Using Secure Coprocessors (1994).
Fujimura et al., XML Voucher Generic Voucher Language, Feb. 2003.

* cited by examiner

| Operator | Incentive | Characters | Word String |
|---|---|---|---|
| 0 | 596 | 10 | Reduce Minimum Payment |
| 0 | 599 | 10 | Discount Credit Rate |
| 6 | 651 | 10 | "Discount Premier" |
| 6 | 651 | 10 | "Discount Average" |
| 6 | 651 | 10 | "Discount Slight" |

FIG. 7

SYSTEM AND METHOD FOR PROVIDING INCENTIVES TO CONSUMERS TO SHARE INFORMATION

FIELD OF THE INVENTION

The invention relates to the field of financial or other accounts, and more particularly to a platform for permitting an individual to allow the sharing of personal information derived from an account with third party companies and other institutions, at selectable levels of their choosing.

BACKGROUND OF THE INVENTION

Financial companies and other institutions, such as credit card companies, increasingly leverage the business value of their accounts and customer base beyond the fees derived from transactions on the accounts themselves. One example of such a technique arises when a first financial institution or other entity provides access to its customer database to a second institution, for marketing or other purposes. The second institution may mine that database to find candidate customers, test price points, determine geographic patterns and perform other research and marketing tasks.

However, because some consumers may be uncomfortable with the fact that they often possess little or no control over their private financial and other information contained in any number of databases, various privacy laws have been enacted controlling the sharing of personal information. Such information may include a person's private information such as name, address, age, social security number and other information, financial information such as existing credit accounts, existing balances, credit histories, income and other information, and medical information such as current health status, policy coverage, pre-existing conditions and other data.

One example of current privacy laws is Regulation P promulgated by the Federal Reserve, which in part requires that when a potential credit consumer seeks to open a credit account, the financial institution taking that application must inform that applicant that the applicant has a right to prevent that institution from sharing their personal information with third parties. The applicant is thus given the opportunity to opt out from allowing the financial or other institution to share their financial and other information with other companies and institutions. This option may also be presented to existing customers of a credit or other institution.

Privacy policies such as these have market consequences. For example, among all new applicants for new accounts that are informed of their ability to opt out from the sharing of their financial information, some percentage may end the application process at that point before even making a choice about privacy settings. Some may do so because they do not believe that the financial or other institution taking their application will honor their obligation not to recirculate such information. The applicants who terminate the application may increase the new-account acquisition costs for the financial or other institution.

Moreover, of the remaining customers that choose to continue the application process, another significant percentage will in fact opt out, thereby preventing the acquiring institution from sharing the customer's information with other institutions. Again, the applicant's or existing account holder's opting out reduces the institution's ability to leverage its customer database. At present, almost forty percent of account holders are choosing to opt out of privacy sharing for their accounts.

These and other drawbacks exist in the handling of privacy-protected accounts.

SUMMARY OF THE INVENTION

The present invention overcomes these and other problems in the art by providing a system and method for a selectable privacy account wherein customers are provided with an array of privacy options which may be associated with a corresponding array of account benefits and features. For instance, according to an embodiment of the invention an applicant who is willing to accept a comparatively larger degree of sharing of their personal or account information may receive an adjusted interest rate, annual fee, bonus point eligibility or other account attribute. Customers may thus be permitted to customize their privacy levels, with corresponding account attributes.

BRIEF DESCRIPTION OF THE DRAWINGS

FIG. 7 illustrates an example of links which may be located within a link file according to the present invention.

DETAILED DESCRIPTION OF PREFERRED EMBODIMENTS

The invention in one regard relates to a system and method for permitting a new-account applicant or an existing customer or account holder to select variable levels of sharing of their account or other personal information in a dynamic manner. The use of the systems and methods of the present invention are also applicable to other systems and methods for convincing consumers to allow for the sharing of their personal information with other parties.

Figure 1:
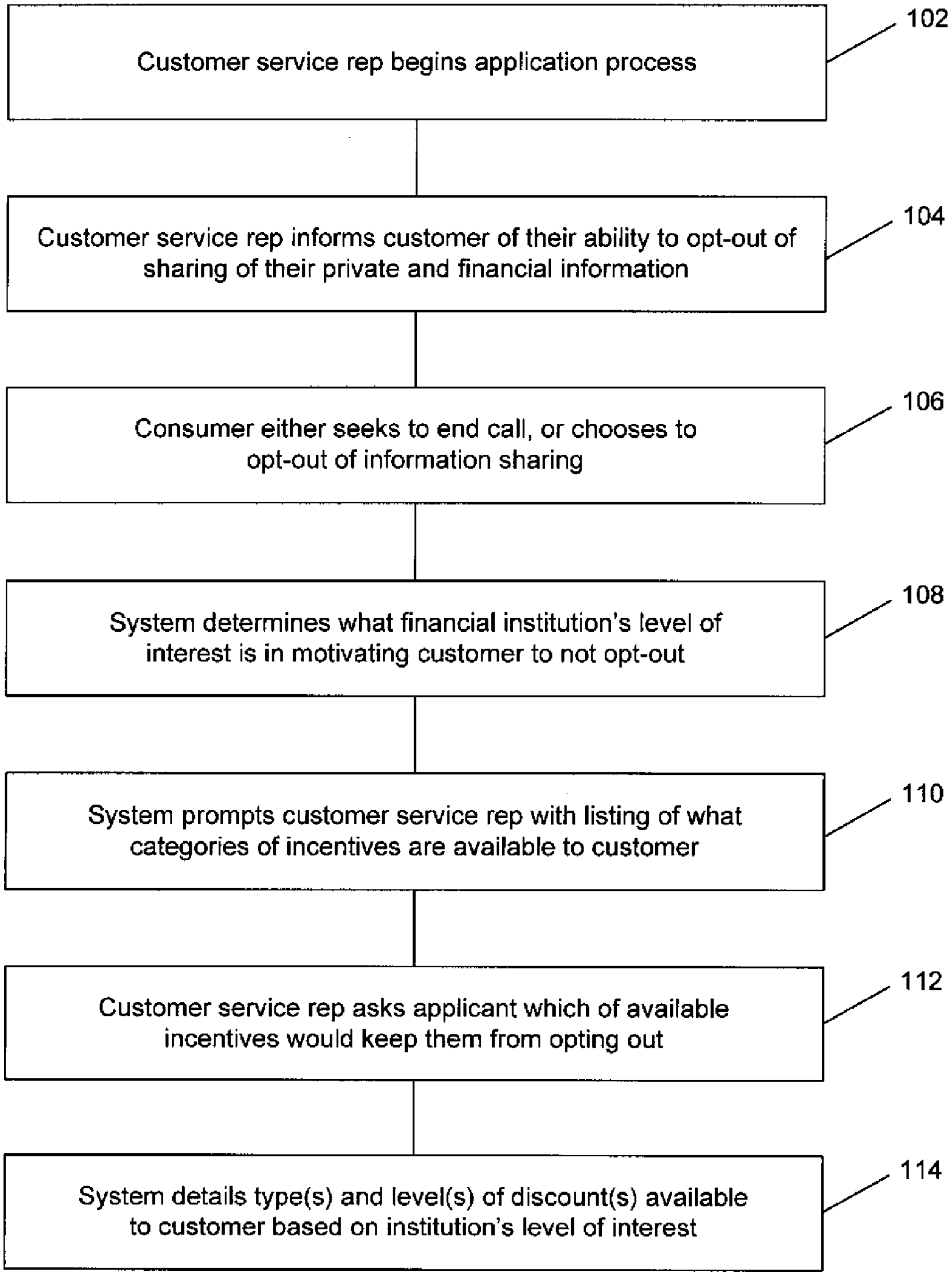
FIG. 1 depicts a flow chart representing a method of implementing the invention according to an embodiment of the invention.

A first preferred embodiment of the present invention will now be discussed with reference to FIG. 1. As shown in FIG. 1, a financial or other institution may take an application for a financial or other type of account, in step 102. During an application process according to an embodiment of the invention, as shown in step 104, a customer service representative may determine whether an applicant wishes to share their private financial or other information. The customer service representative may, for instance, communicate with the applicant via telephone, such as from a call center, or via Internet messaging or other channels. If the applicant is willing to share this information without prompting or motivation, there may be no need to present them with account incentives to do so.

If on the other hand, as shown in step 106, the applicant wishes to terminate the application process without completing the application, or simply does not wish to allow the institution to which it is applying to share their private and financial information with other entities, according to the invention an attempt may be made to present that applicant with selectable levels of privacy in exchange for modified or enhanced account attributes, such as differential interest rates, annual or other fees, rewards points or other attributes. In another embodiment, all applicants may be presented with selectable privacy levels with corresponding account or other attributes.

Figure 2:
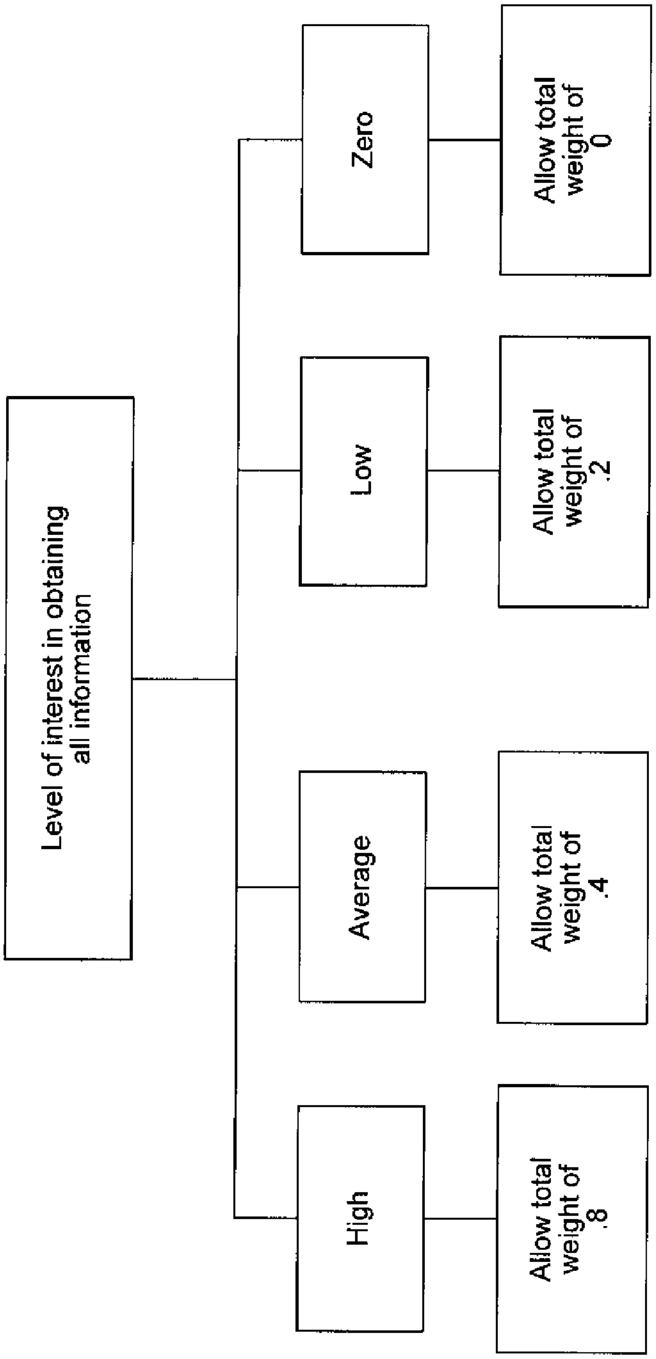
FIG. 2 illustrates a representation of a hierarchical organizational structure according to an embodiment of the invention.

As shown in step 108 in FIG. 2, according to the invention a decision tree or matrix may be used to evaluate the financial institution's level of interest in motivating the applicant to not exercise their ability to opt out of the sharing of their private and financial information. As shown in FIG. 2, a top-down tree may include a category labeled "Level Of Interest." The "Level Of Interest" category may be divided into sub-categories, such as "High," "Average," "Low" and "Zero." Each of these sub-categories may have a weight or other value associated with them, which reflects the financial institution's level of interest in motivating the customer to participate by offering discounts to the fees and rates the financial institution charges its customers.

For example, the sub-category "High" may have an assigned weight of 0.8. The weight of 0.8 may represent the value that the sum of all the weights assigned to various incentives offered to the applicant in order to motivate them to participate, may not exceed. Similarly, the primary sub-categories "Average," "Low," and "Zero" might have associated values of 0.4, 0.2 and 0, respectively. These values also equal the value that the sum of all the weights assigned to the various incentives offered to the applicant in order to motivate them to participate, or to participate at a desired level of privacy, may not exceed.

Assuming that the financial institution set its "Level Of Interest" factor at "Average" or 0.4, the customer representative communicating with the customer would be free to offer that applicant any number of incentives so long as the sum of all the weights associated with each incentive did not exceed 0.4.

One aspect of the invention involves an organizational structure, which may have both a top-down taxonomy and a bottom-up taxonomy. The organizational structure stores and classifies information, such as weights or incentives. According to an embodiment of the invention, an organizational structure may be a hierarchical, relational or other database.

As discussed above, each "Level Of Interest" has a weight assigned to it, which allows the financial institution to assign a value representing how large of an incentive package it is willing to offer an applicant so that the applicant may participate. An organizational structure setting forth each level of interest may be created. And a link file may direct a processor to translate information from data sources, such as internal reports, into the organizational structure thereby allowing the financial institution to properly set the weight associated with each "Level Of Interest," as well as setting the actual "Level Of Interest" weight to be used in motivating an applicant to share their private and financial information.

Figure 3:
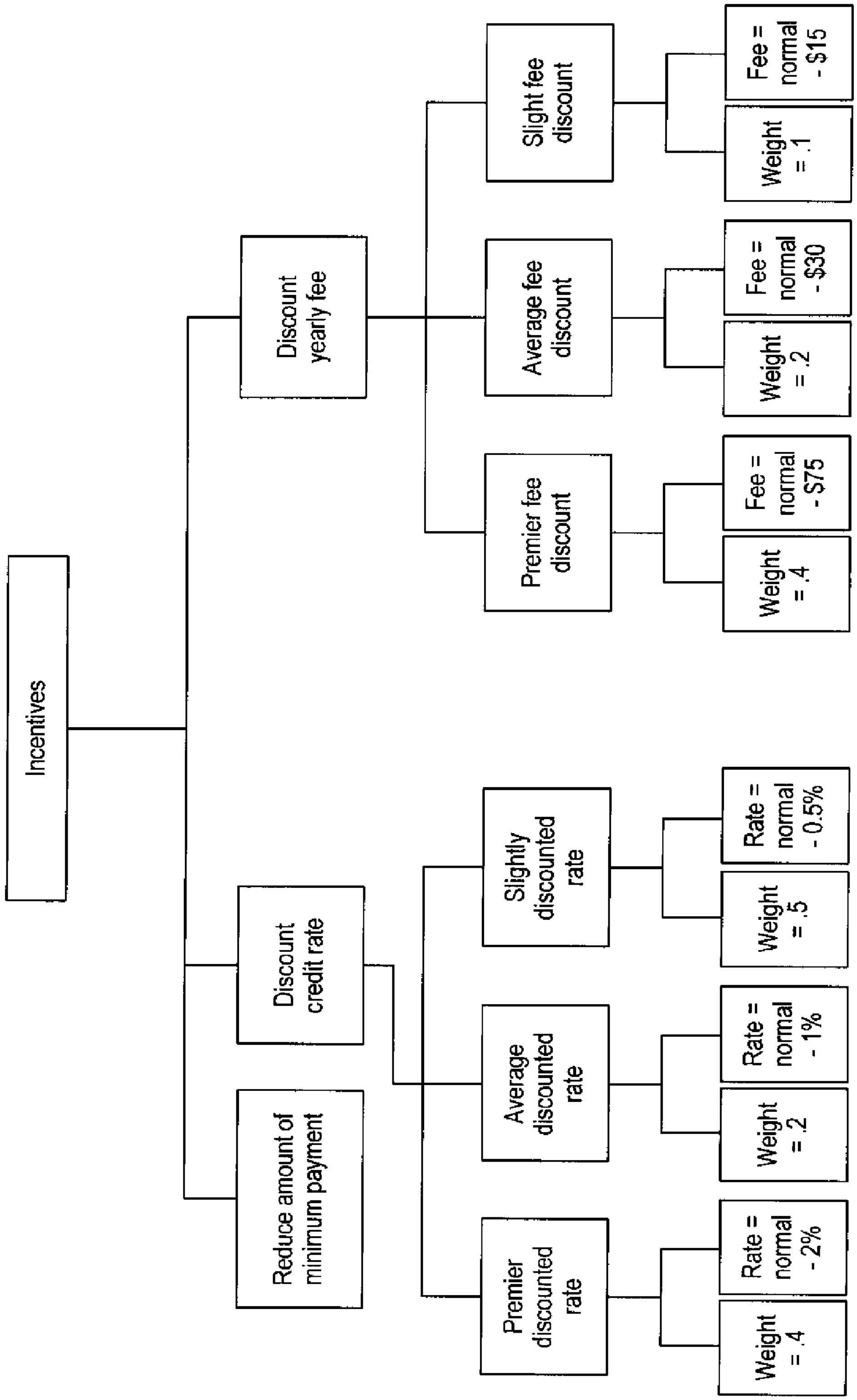
FIG. 3 illustrates a representation of a hierarchical organizational structure according to an embodiment of the invention.

As shown in FIG. 1, after the system determines what the financial institution's "Level Of Interest" is in motivating the applicant to participate, the system, in step 110, prompts the customer service representative with a listing of what categories of incentives are available to the applicant so as to motivate the applicant to participate. As shown in FIG. 3, an example decision tree which may be used by the customer representative is provided. The top-down decision tree in FIG. 3 may be created based on incentive and weight information. For instance, as shown in FIG. 3, the decision tree may comprise a category labeled "Incentives." The "Incentives" category may be divided into sub-categories, such as "Discount Rate Charged," "Reduce Amount Of Minimum Payment," "Discount Yearly Fee," "Enhance Rewards Program" or others. These sub-categories may in turn be divided into further sub-categories. For example, the sub-category "Discount Rate Charged" may contain the sub-categories entitled "Premier Discounted Rate," "Average Discounted Rate," and "Slightly Discounted Rate."

The sub-category may also have multiple sub-categories containing various information that allows a determination of how to incent an applicant to participate in information sharing. For example, the secondary sub-category entitled "Premium Discount Rate" may have a sub-category entitled "Incentive Weight" associated with it as well as another sub-category entitled "Rate Discount." For example, the "Premier Discounted Rate" might have an associated "Incentive Weight" of 0.4, and a discount rate equal, for example, to the normal account rate minus 2%.

Another example of possible sub-categories can be illustrated by examining the sub-category entitled "Discount Yearly Fee." Its associated sub-categories could be entitled "Premier Fee Discount," "Average Fee Discount," and "Slight Fee Discount." Similar to the sub-categories discussed above, the "Average Fee Discount" could have associated further sub-categories entitled "Incentive Weight" and "Fee" which have an associated weight of 0.4, and a fee equal to the normal annual fee minus $30, or another amount, respectively.

In the example of the hierarchical organizational structure above, it may be determined that additional discounts are being considered or offered, but which do not fit under any of the sub-categories currently in use. The organizational structure may be altered to create a new sub-category as needed, which would be labeled to fit the new incentives. Doing so creates a more accurate structure for motivating applicants to allow various institutions to share their personal information with other parties. When modifying the organizational structure, categories and sub-categories of any level may be added, deleted, or merged as appropriate.

According to a further preferred embodiment of the invention, after the system prompts the customer service representative with a listing of categories of incentives that are available to the applicant, the customer service representative, as shown in FIG. 1, step 112, may ask the applicant which of the available incentives would keep them from opting out from allowing the institution to share their private and financial information. As shown in step 114, if the applicant stated that they were interested in for instance the "Discount Rate Charged" incentive, the customer service representative would inform them that they were eligible for the "Premier Discounted Rate" since its weight equals but does not exceed the weight of the financial institution's motivation, i.e., 0.4. The customer service representative would then inform the customer that they were eligible for a rate discount of 2% or another amount less than the financial institution's normal rate.

If that incentive sufficiently motivated the applicant to agree to allow the financial institution to share their private and financial information with other financial institutions, then the application process would proceed to completion. However, if the applicant was still not motivated to allow the financial institution to share their private and financial information, the customer service representative would then inform the applicant that they could instead choose the "Discount Yearly Fee" incentive. And since the weight of the financial institution's "Level Of Interest" was 0.4, the applicant was eligible for the "Premier Fee Discount" of $75 less than the financial institution's normal yearly fee, since that incentive's associated weight was also 0.4. If the "Discount Yearly Fee" incentive sufficiently motivated the applicant to allow the financial institution to share their private and financial information with other financial institutions, the application process would then proceed to completion.

Many permutations of the above discussed incentives could also be offered to the applicant. For example, if either the "Discount Credit Rate" or the "Discount Yearly Fee" incentives in and of themselves did not sufficiently motivate the applicant to participate, the customer service representative can still continue to negotiate with the applicant so as to motivate them to participate. For example, the customer service representative would inform the applicant that they were eligible for an "Average Discounted Rate" of 1% less then the company's normal rate charged, plus an "Average Fee Discount" of $30 off the fee the company normally charged its customer. Both of these incentives would be available to the applicant because each has an associated weight of 0.2, and the sum of their associated weights equals 0.4, which does not exceed the weight assigned to the financial institution's "Average" "Level Of Interest" in keeping the applicant from opting out.

Figure 4:
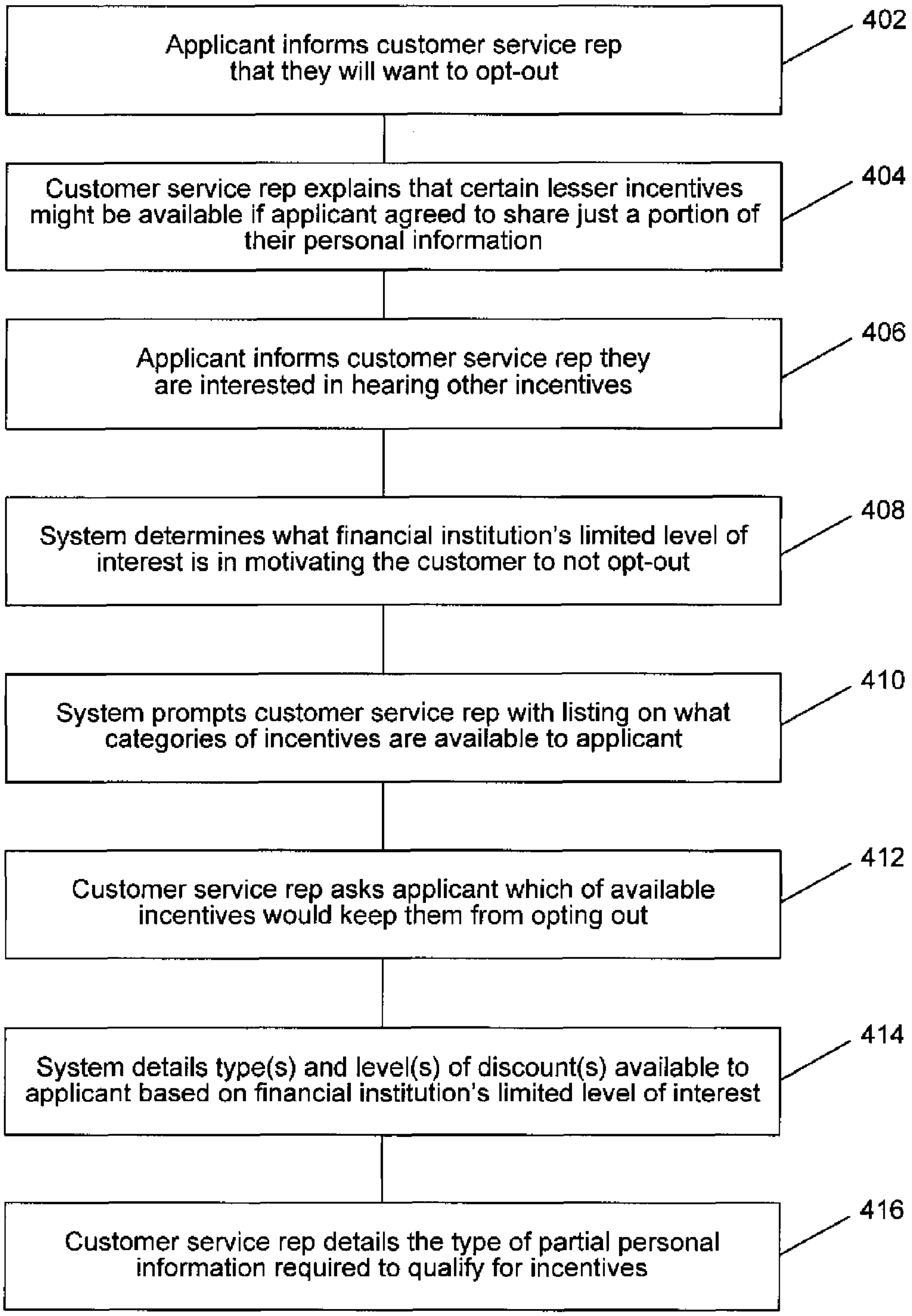
FIG. 4 depicts a flow chart representing a method of implementing the present invention according to an embodiment of the invention.

In another embodiment of the invention as shown in FIG. 4, if after exhausting all permutations of available incentives for a given "Level Of Interest" the applicant, as shown in step 402 still wished to opt out of allowing the financial institution to share their private and financial information with other institutions, the customer service representative as shown in step 404, may attempt to motivate the customer to participate by explaining that if the customer allowed only a portion of their private information to be shared, they could still receive certain differential or other benefits. If as shown in step 406 the applicant wishes to hear the other available incentives, the system determines as shown in step 408 what the financial institution's "Limited Level Of Interest" is in motivating the applicant to share even just a limited amount of personal information. For example, after the applicant informed the customer service representative that they still wanted to decline to share information, the system would determine what the "Limited Level Of Interest" was for gaining permission to share only limited information.

Figure 5:
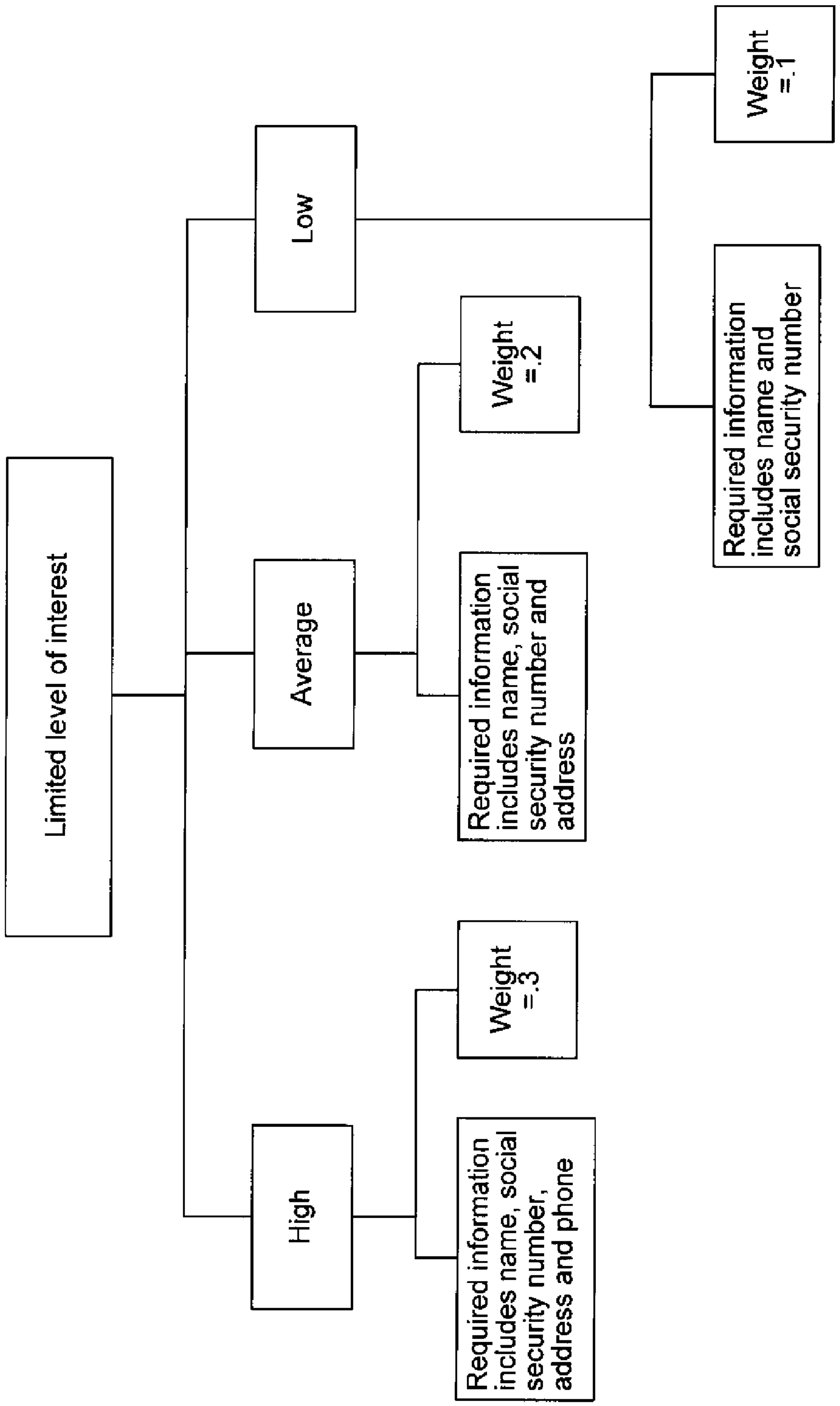
FIG. 5 illustrates a representation of a hierarchical organizational structure according to an embodiment of the invention.

According to a preferred embodiment, the system may use a top-down decision tree as shown in FIG. 5 to determine the financial institution's "Limited Level Of Interest" in motivating the applicant to at least share a partial amount of their personal information. As further shown in FIG. 5, a top-down decision tree may comprise a category labeled "Limited Level Of Interest." And the "Limited Level Of Interest" category may be divided into various primary sub-categories, such as "High," "Average," and "Low." Each of these primary sub-categories may then divided into various secondary sub-categories.

For example, the primary sub-category entitled "High" will have a secondary sub-category entitled "Required Information" associated with it as well as another secondary sub-category entitled "Weight." For example, a "High" "Limited Level Of Interest" might have an associated "Required Information" consisting of: name; social security number; address; and phone, and an associated "Weight" of 0.3. Similarly, an "Average" "Limited Level Of Interest" might have an associated "Required Information" consisting of: name; social security number; and address, and an associated "Weight" of 0.2, while a "Low" "Limited Level Of Interest" might have an associated "Required Information" consisting of just the applicant's name and social security number, and an associated "Weight" of 0.1.

As discussed above, the "Weight" associated with each "Limited Level Of Interest" represents the value that the sum of all the weights assigned to various incentives offered to the applicant in order to motivate the applicant to share a limited amount of personal information, can not exceed. As shown in FIG. 4, step 410, depending on the financial institution's "Limited Level Of Interest" and its associated "Weight," the system will prompt the customer service representative with the categories of incentives that are available to the applicant. And as shown in step 412, after the customer service representative listed the available incentives, and the customer service representative detailed the types and levels of incentives available to applicant as shown in step 414, the customer service representative would then, as shown in step 416, detail for the applicant the type of personal information required to qualify for the available incentives.

For example, after the system determined that the financial institution's "Limited Level Of Interest" in obtaining partial amounts of personal information was "Low," the customer service representative would inform the applicant that in order to qualify for any of the incentive(s) that equaled the weight of 0.1 the applicant would have to agree to allow the financial institution to share at least their name and social security number with third party financial institutions. However, if the financial institution's "Limited Level Of Interest" in acquiring the partial information were "High," the weight of 0.3 would require that the applicant agree to allow to share, at least, for example, their name, social security number, address and phone number.

As discussed above, the customer service representative might be able to offer varying permutations of incentives, so long as the sum of the assigned weight of all the incentives does not exceed the weight assigned to the financial institution's "Limited Level Of Interest."

According to a further preferred embodiment of the invention, the system and method of the present invention may further include steps to monitor the success in motivating applicants from not opting out, and making adjustments to its level of interest when needed. Accordingly, a company employing the present invention may adjust its factors for awarding incentives so to either decrease the number of applicants opting out, or to decrease the level of incentives it gives away.

Figure 6:
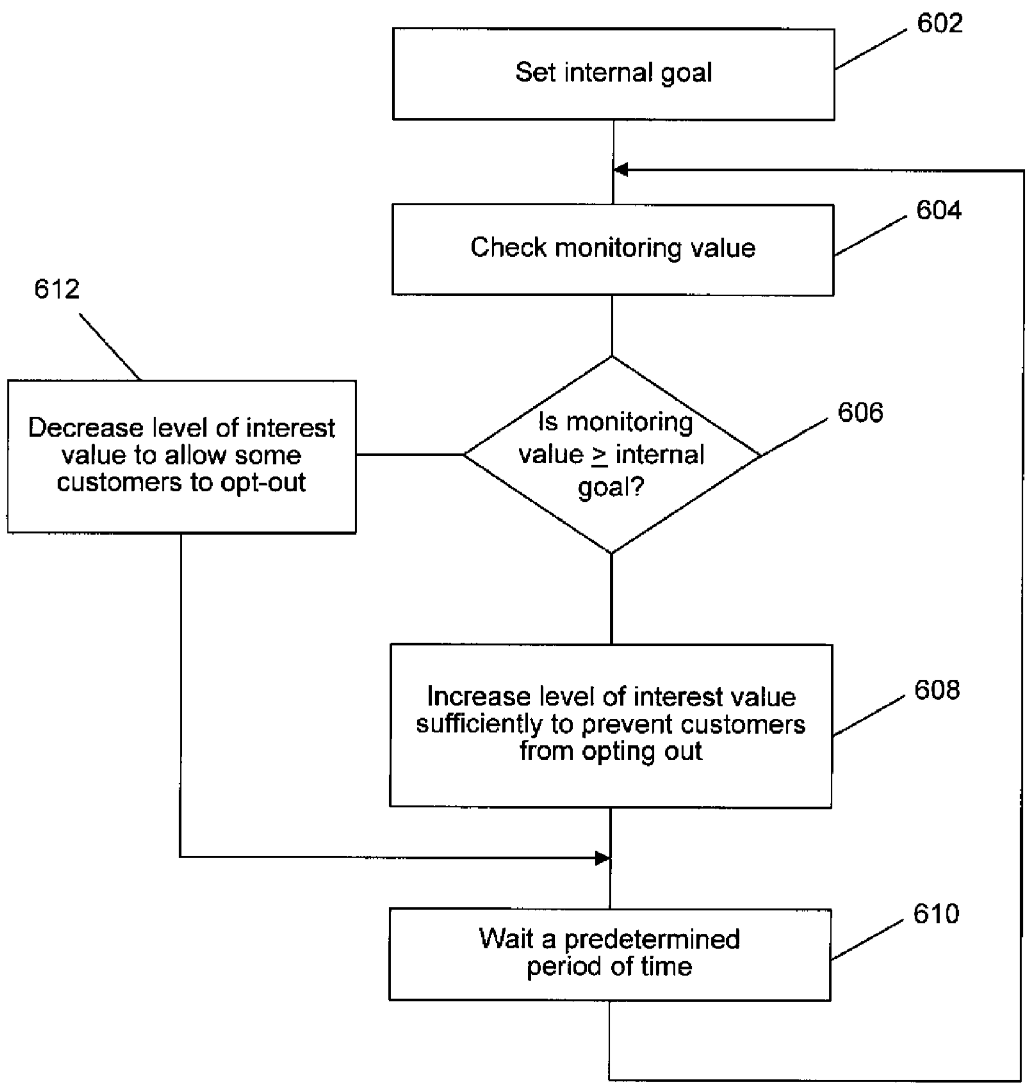
FIG. 6 depicts a flow chart representing a method of implementing the present invention according to an embodiment of the invention.

As shown in FIG. 6, monitoring the financial institution's success may begin as shown in step 602 by the financial institution setting the value of the Internal Goal according to any number of parameters. For example, if the financial institution did not offer any incentives to its applicants, its opt out rate may match that of the industry average. Because the inventive system and method allows the financial institution to induce individuals to participate by offering them incentives, the financial institution might set its Internal Goal of achieving an opt out rate of the average rate for the industry minus 10 percent, or another level.

After setting the "Internal Goal," the system and method may check the "Monitoring Value," as shown in step 604. The "Monitoring Value" may correspond to the number of individuals that exercise the opt out option. The greater the opt out rate, the higher the "Monitoring Value." By keeping track of the rate at which applicants choose to not allow the financial institution to share their private and financial information with other financial institutions, that financial institution can determine whether it is meeting its "Internal Goal" of attracting applicants to participate.

After the “Monitoring Value” is determined, as shown in step 606, it may be compared to the value representing the financial institution’s “Internal Goal” of motivating applicants to participate. By comparing the “Monitoring Value” to the “Internal Goal,” the financial institution can determine how aggressively it needs to offer incentives to applicants in order to motivate them to participate. For example, if the “Monitoring Value” is significantly greater than the amount the financial institution had set as its “Internal Goal,” it may elect to offer incentives more aggressively to applicants. Accordingly, if the “Level Of Interest” had been set at “Low,” in this instance the financial institution may reset it to “High” as shown in step 608. Then as shown in step 610, a period of time may pass before returning to step 604. Setting the “Level Of Interest” to “High” allows the customer service representative to offer a large number of attractive incentives, such as, for example, both a “Premium Discount Credit Rate” along with a “Premier Fee Discount” since the sum of the respective weights equals the 0.8, the weight of the “High” “Level Of Interest.”

Conversely, if the “Monitoring Value” is averaging closer to the “Internal Goal,” then the institution may have the flexibility as shown in step 612 of decreasing the weight of the “Level Of Interest” before returning to step 610. The weight of the “Level Of Interest” could be set to “Zero,” which results in the weight also being set to 0.0. Doing so may prevent the customer service representative from offering any incentives, thereby saving the financial institution the cost associated with giving away each and every incentive.

In accordance with a further preferred embodiment of the invention, the financial institution can set these values on an hourly, daily, weekly, monthly or other dynamic basis. For example, a financial institution might set a goal that it would achieve a specified opt out rate averaged over an entire month. Therefore, it might start out at Day 1 with its “Internal Goal” set at a relatively conservative amount, with the hope that its customer service representatives would be able to convince the remaining to participate while at the same time not offering any incentives for allowing the sharing of their private and financial information. For instance, the financial institution might set its “Level Of Interest” to “Zero” at that early point in the month.

Thereafter, if on Day 10 the financial institution determined that the “Monitoring Value” was averaging less than the desired amount, it may increase the weight of the “Level Of Interest” so as to motivate the applicants to participate more freely. Then if on Day 24 the financial institution determined that the “Monitoring Value” averaged greater than the desired amount over the past twenty-three days and it appeared that it would meet its “Internal Goal”, it could readjust the “Level Of Interest” to a weight that would ensure that the financial institution would meet its “Internal Goal” on the last day of the month, while reducing the amount of incentives provided to applicants in that interval, thereby reducing expense.

According to an embodiment of the invention, multiple information storage devices may be used to receive appropriate information. Accordingly, the negotiating information discussed above, including for example the incentives, level of interest, internal goals and the monitoring value, may be received in an information storage device from a plurality of separate sources. Further, a link file may be used to access the negotiating information from a information storage device and to place it into an organizational structure. According to an embodiment of the invention, a link file may include a plurality of instructions. These instructions may, for example, direct a processor to compare the level of interest in a predetermined location in an organizational structure to the weight of an incentive in a predetermined location in an organizational structure. Thus according to an embodiment of the invention, a link file may comprise a number of links to place information in appropriate location(s) within an organizational structure. Accordingly, information may be placed within appropriate categories and sub-categories of an organizational structure, such as a hierarchical tree in a relational database, or other resource.

FIG. 7 illustrates an example of links which may be located within a link file and which may be used to place negotiating information into an organizational structure. As shown, links may comprise operator instructions, incentive code information, character instruction information, word string information, as well as other information.

According to a preferred embodiment of the invention, operator instructions may direct a processor to perform a variety of operations for placing information within an organizational structure of the invention. A processor may search a negotiable information storage device, retrieve specified incentive information, and place the retrieved information in an organizational structure of the present invention. Incentive code information may indicate the incentive category or sub-category to assign the results of a particular operator instruction. Character instruction information may indicate the number of characters to access, while word-string information may indicate the particular character to access. Other interaction may also occur.

According to an embodiment of the invention, operator instructions may instruct a processor to access information from a negotiation information storage device. Operator instructions may contain a plurality of instructions for a processor. Further, an operator instruction may include various components, including character matching, word matching, and duration of processing. Other operator components may also be used.

According to an embodiment of the invention, character matching components may instruct a processor to search a negotiation information storage device by various character parameters. Character parameters may include, for example, searching column by column in an organizational structure for character matching, searching all of a column for two word matching, searching all of a column but the first word for matching, and other character parameters.

Word matching components may instruct a processor to search for a specific word in a text-string in the incentive database. Word matching may include, for example, matching a particular word, matching two words and searching the entire column, searching for two words but searching all but the first word, and searching for a specific city and/or state. Other word matching instructions may also be used.

Length of processing components may direct a processor to end processing. Accordingly, length of processing instructions may instruct a transaction processor to stop after finding a first match, stop after finding a predetermined number of matches, or look for all matches within an incentive database. Other length of processing instructions may also be used.

It will be appreciated that the system for implementing the invention may constitute a variety of different components and/or configurations. Separate devices may be used to implement each function. According to an embodiment of the invention, a computer processing unit may be configured to implement the various aspects of the invention. Other components, configurations, or combinations thereof may also be used.

The invention has been described in reference to a credit institution negotiating with individuals applying for credit with that credit institution, whereby the credit institution may negotiate with applicants that decline to allow the financial institution with which they are applying to share their private and financial information with other financial institutions, by offering those applicants incentives to allow such sharing of their private and financial information. However, individuals possess many types of information useful to institutions other than financial institutions and those types of information may also be processed according to the invention.

For example, an individual may be hesitant to allow their health insurance company to share aspects of their private and medical information with other insurance carriers. The system and method could be applied to motivate either a person already insured or motivate an applicant for health insurance to allow the health insurance company to share their private and medical information with other heath insurance companies by offering incentives similar to the ones described above, as well as offering other types of incentives. Such incentives may include, for example, reducing the amount of the insured's annual deductible, reducing the amount of insured's co-pay, as well as other incentives.

According to another embodiment of the invention, a computer usable medium having computer readable program code embodied therein for presenting table information in portions may be provided. For example, the computer usable medium may include a CD ROM, a floppy disk, a hard disk, or any other computer usable medium. One or more of the aspects of a system according to the present invention may comprise readable program code that is provided on the computer usable medium such that when the computer usable medium is installed on a computer system, those modules cause the computer system to perform the functions described.

These and other embodiments and uses of the invention will be apparent to those skilled in the art from consideration of the specification and practice of the invention disclosed herein. The specification and examples should be considered exemplary only. The scope of the invention is intended to be limited only by the claims appended hereto.

What is claimed is:

1. A computer implemented method of providing incentives for the sharing of information, said method comprising the steps of:

accepting consumer information;

storing the consumer information in electronic form in at least one electronic database, wherein, by default, at least a sub-set of the consumer information is made available to a third party;

requesting a decision from a consumer regarding opting out of sharing the sub-set of the consumer information with the third party;

receiving a response from the consumer to opt-out of sharing the sub-set of the consumer information with the third party;

determining, using a programmed computer, following the response, a level of interest in keeping the consumer from opting out of sharing the sub-set of the consumer information;

determining, using the programmed computer, a subcategory of the level of interest having a first weight assigned that comprises the level of interest in keeping the consumer from opting out of sharing the sub-set of the consumer information;

searching an electronic database for a selected incentive based on the subcategory of the level of interest;

comparing a second weight assigned to the selected incentive offered to the first weight such that the second weight cannot exceed the first weight and wherein multiple incentives are capable of being selected to comprise the selected incentive as long as the sum of each second weight of each of the multiple incentives does not exceed the first weight; and offering the consumer the selected incentive in exchange for their permission to share the sub-set of the consumer information with the third party, wherein the selected incentive is offered prior to sharing of the sub-set of the consumer information.

2. The method according to claim 1, wherein the level of interest in keeping the consumer from opting out of sharing the sub-set of information is determined by analyzing at least one factor from the group of factors comprising: the amount of consumer information; the detail of the consumer information; the socio-economic status of the consumer; and the credit worthiness of the consumer.

3. The method according to claim 1, wherein the selected incentive is chosen from the group comprising:

(a) a reduction in a minimum payment;

(b) a discount on an annual credit rate;

(c) a discount on a yearly fee; and (d) a rewards program.

4. The method of claim 1, further comprising:

receiving a negative response, from the consumer, to the offering of the selected incentive;

calculating a limited level of interest in having the customer share a limited amount of consumer information that is less than the sub-set of consumer information;

searching an electronic database for at least one second incentive based on a subcategory associated with the limited level of interest; and offering the consumer the second incentive in exchange for their permission to share the limited amount consumer information with the third party, wherein the second incentive is offered prior to sharing of the sub-set of the consumer information.

5. The method of claim 1, wherein the first weight represents the value of the consumer to a financial institution.

6. A computer implemented method of providing incentives for the sharing of information, said method comprising the steps of:

accepting consumer information;

storing the consumer information in electronic form in at least one electronic database, wherein, by default, at least a sub-set of the consumer information is shared with a third party;

requesting a decision from a consumer regarding opting out of sharing the sub-set of the consumer information with the third party;

receiving a response from the consumer to opt-out of sharing the sub-set of the consumer information with the third party;

determining, using a programmed computer, following the response, a level of interest in keeping the consumer from opting out of sharing the sub-set of the consumer information, wherein the level of interest in keeping the consumer from opting out of sharing the sub-set of information is determined by analyzing at least one factor from the group of factors comprising: the amount of consumer information; the detail of the consumer information; the socio-economic status of the consumer; and the credit worthiness of the consumer;

determining, using the programmed computer, a subcategory of the level of interest having a first weight assigned that comprises the level of interest in keeping the consumer from opting out of sharing the sub-set of the consumer information;

searching an electronic database for a selected incentive based on the subcategory of the level of interest, wherein the selected incentive is chosen from the group comprising:

(a) a reduction in a minimum payment;

(b) a discount on an annual credit rate;

(c) a discount on a yearly fee; and (d) a rewards program;

comparing a second weight assigned to the selected incentive offered to the first weight such that the second weight cannot exceed the first weight and wherein multiple incentives are capable of being selected to comprise the selected incentive as long as the sum of each second weight of each of the multiple incentives does not exceed the first weight; and offering the consumer the selected incentive in exchange for their permission to share the sub-set of the consumer information with the third party, wherein the selected incentive is offered prior to sharing of the sub-set of the consumer information.

* * * * *

UNITED STATES PATENT AND TRADEMARK OFFICE

CERTIFICATE OF CORRECTION

PATENT NO. : 8,301,493 B2
APPLICATION NO. : 10/287558
DATED : October 30, 2012
INVENTOR(S) : Sanders et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1777 days.

Signed and Sealed this
Eleventh Day of November, 2014

Michelle K. Lee

Michelle K. Lee
*Deputy Director of the United States Patent and Trademark Office*